United States Patent
Benini et al.

(10) Patent No.: US 10,540,782 B2
(45) Date of Patent: Jan. 21, 2020

(54) IMAGE PROCESSING FOR POSE ESTIMATION

(71) Applicant: Colorado Seminary Which Owns and Operates the University of Denver, Denver, CO (US)

(72) Inventors: Alessandro Benini, Denver, CO (US); Matthew J. Rutherford, Denver, CO (US); Kimon P. Valavanis, Denver, CO (US)

(73) Assignee: Colorado Seminary Which Owns and Operates the University of Denver, Denver, CO (US)

( * ) Notice: Subject to any disclaimer, the term of this patent is extended or adjusted under 35 U.S.C. 154(b) by 0 days.

(21) Appl. No.: 15/814,232

(22) Filed: Nov. 15, 2017

(65) Prior Publication Data

US 2018/0150970 A1    May 31, 2018

Related U.S. Application Data

(60) Provisional application No. 62/422,524, filed on Nov. 15, 2016.

(51) Int. Cl.
*G06K 9/00* (2006.01)
*G06T 7/73* (2017.01)
(Continued)

(52) U.S. Cl.
CPC ............. *G06T 7/73* (2017.01); *G06T 1/20* (2013.01); *G06T 7/13* (2017.01); *G06T 7/60* (2013.01);
(Continued)

(58) Field of Classification Search
CPC combination set(s) only.
See application file for complete search history.

(56) References Cited

U.S. PATENT DOCUMENTS 9,067,671 B2 *  6/2015  Stark .................... G05D 1/101
9,607,219 B2 *  3/2017  Greveson ........... G06K 9/00476
(Continued)

OTHER PUBLICATIONS

Krajnik et al., "A practical multirobot localization system." Journal of Intelligent & Robotic Systems 76, No. 3-4 (2014): 539-562. (Year: 2014).*

(Continued)

*Primary Examiner* — Feng Niu
(74) *Attorney, Agent, or Firm* — Neugeboren O'Dowd PC

(57) ABSTRACT

A method for estimating a pose of a first object in relation to a second object, the second object comprising a visual marker comprising a plurality of ellipses comprises capturing a video image of the visual marker with an image capture device on the first object, then pre-processing frames of the video image on a graphics processing unit. The method comprises detecting the visual marker by finding contours in the frames to identify the plurality of ellipses and determining that a pattern of the plurality of ellipses match a known pattern of the visual marker. Then the method comprises obtaining coordinates of two or more of the plurality of ellipses of the visual marker, estimating the pose of the first object in relation to the second object by inputting the coordinates of the plurality of ellipses into a pose estimation algorithm, and filtering results of the pose estimation algorithm.

22 Claims, 21 Drawing Sheets

(51) Int. Cl.
  *G06T 7/60* (2017.01)
  *G06T 1/20* (2006.01)
  *G06T 7/13* (2017.01)

(52) U.S. Cl.
  CPC ............... *G06T 2207/10016* (2013.01); *G06T 2207/10032* (2013.01); *G06T 2207/30204* (2013.01)

(56) References Cited

U.S. PATENT DOCUMENTS

| | | | |
|---|---|---|---|
| 9,734,589 B2* | 8/2017 | Yu | ................. A61B 5/1127 |
| 2015/0248584 A1* | 9/2015 | Greveson | ........... G06K 9/00476 382/113 |
| 2016/0035108 A1* | 2/2016 | Yu | ................. A61B 5/1127 382/131 |
| 2016/0122038 A1* | 5/2016 | Fleischman | ............... G06T 7/73 701/2 |

OTHER PUBLICATIONS

Cucci, "Accurate optical target pose determination for applications in aerial photogrammetry." ISPRS Annals of Photogrammetry, Remote Sensing and Spatial Information Sciences 3, no. Article (2016): 257-262. (Year: 2016).*

Benini, A., et al., "Real-Time, GPU-Based Pose Estimation of a UAV for Autonomous Takeoff and Landing", "Robotics and Automation", May 16, 2016, pp. 8 Publisher: IEEE.

* cited by examiner

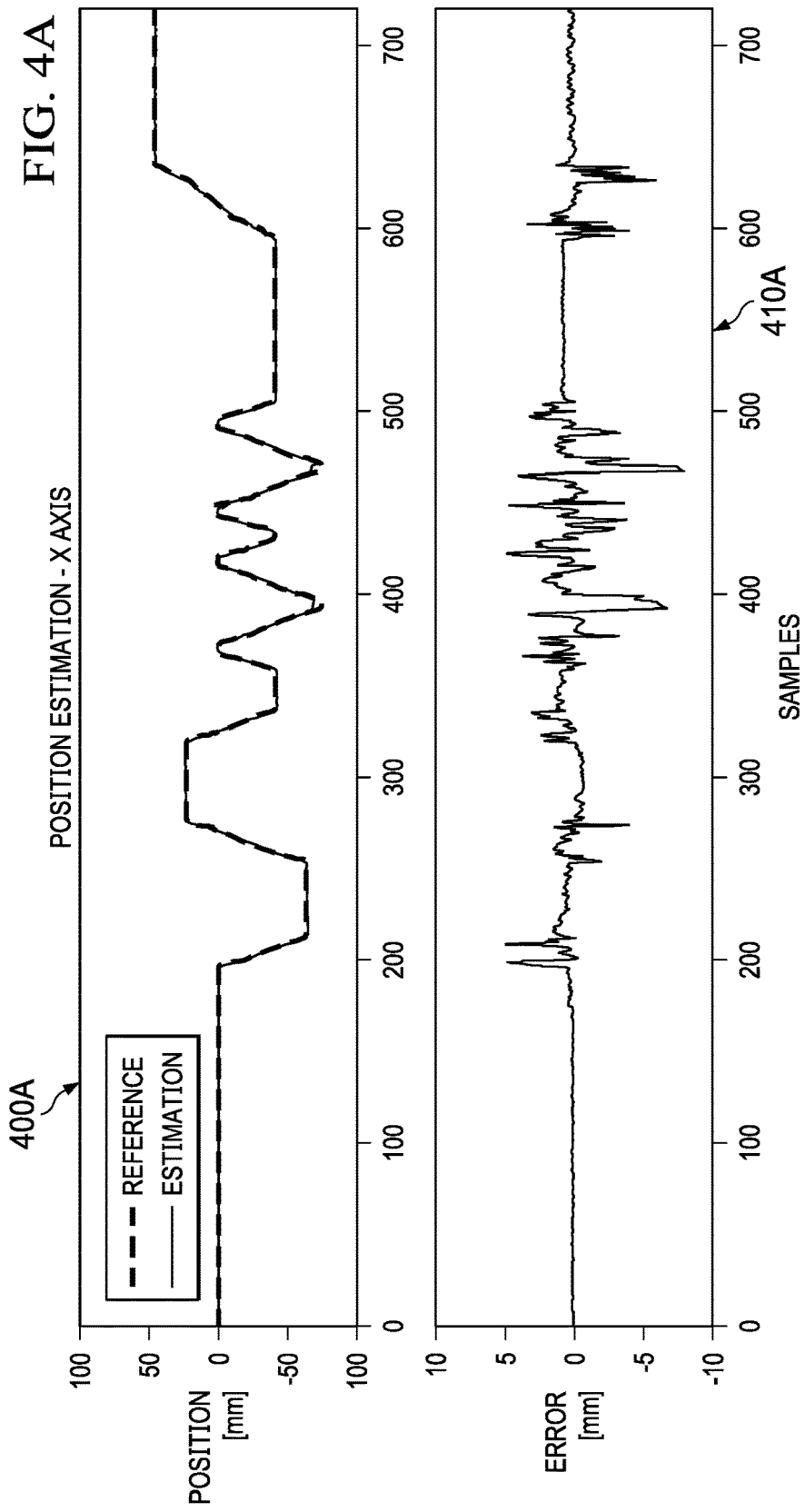

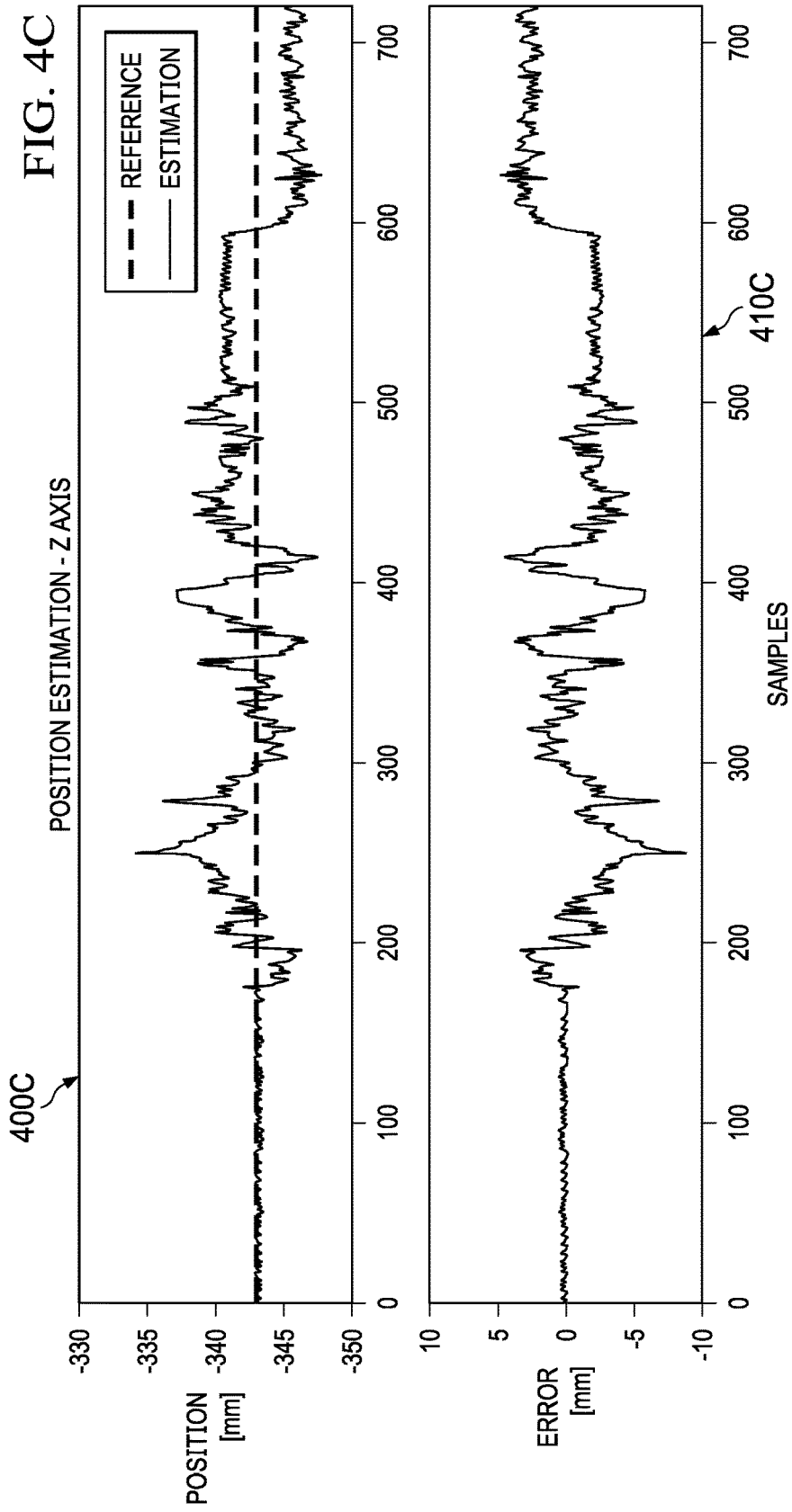

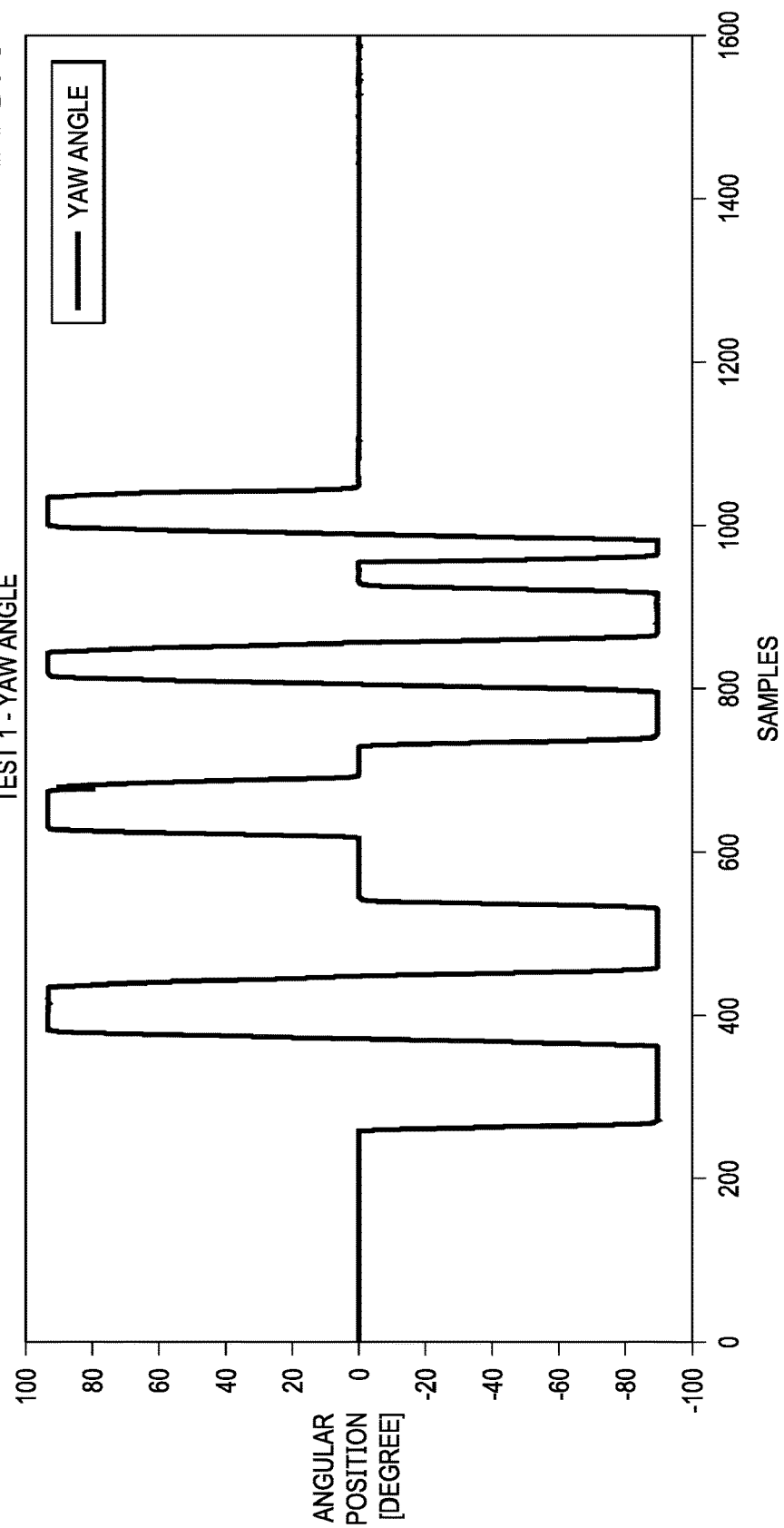

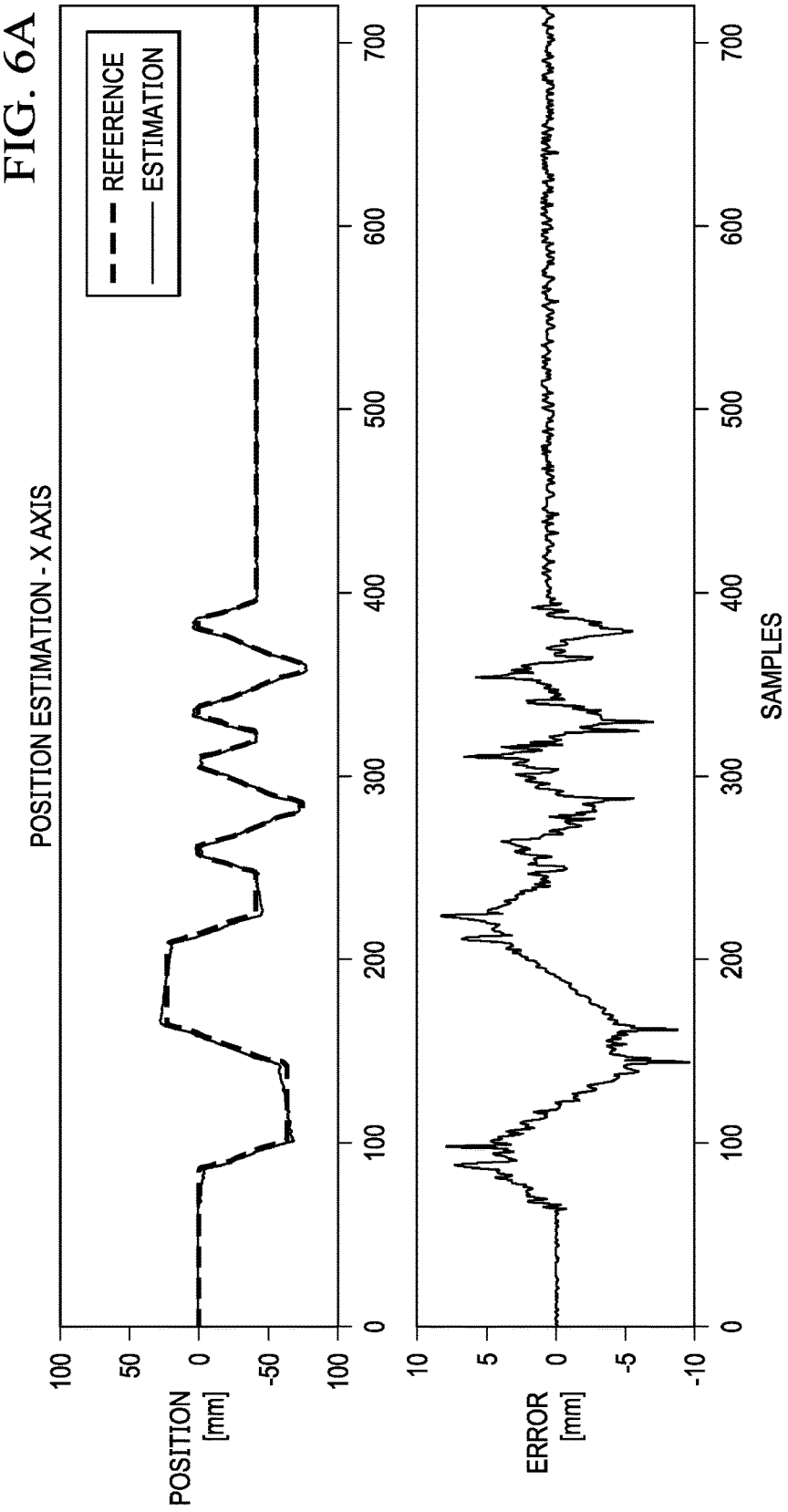

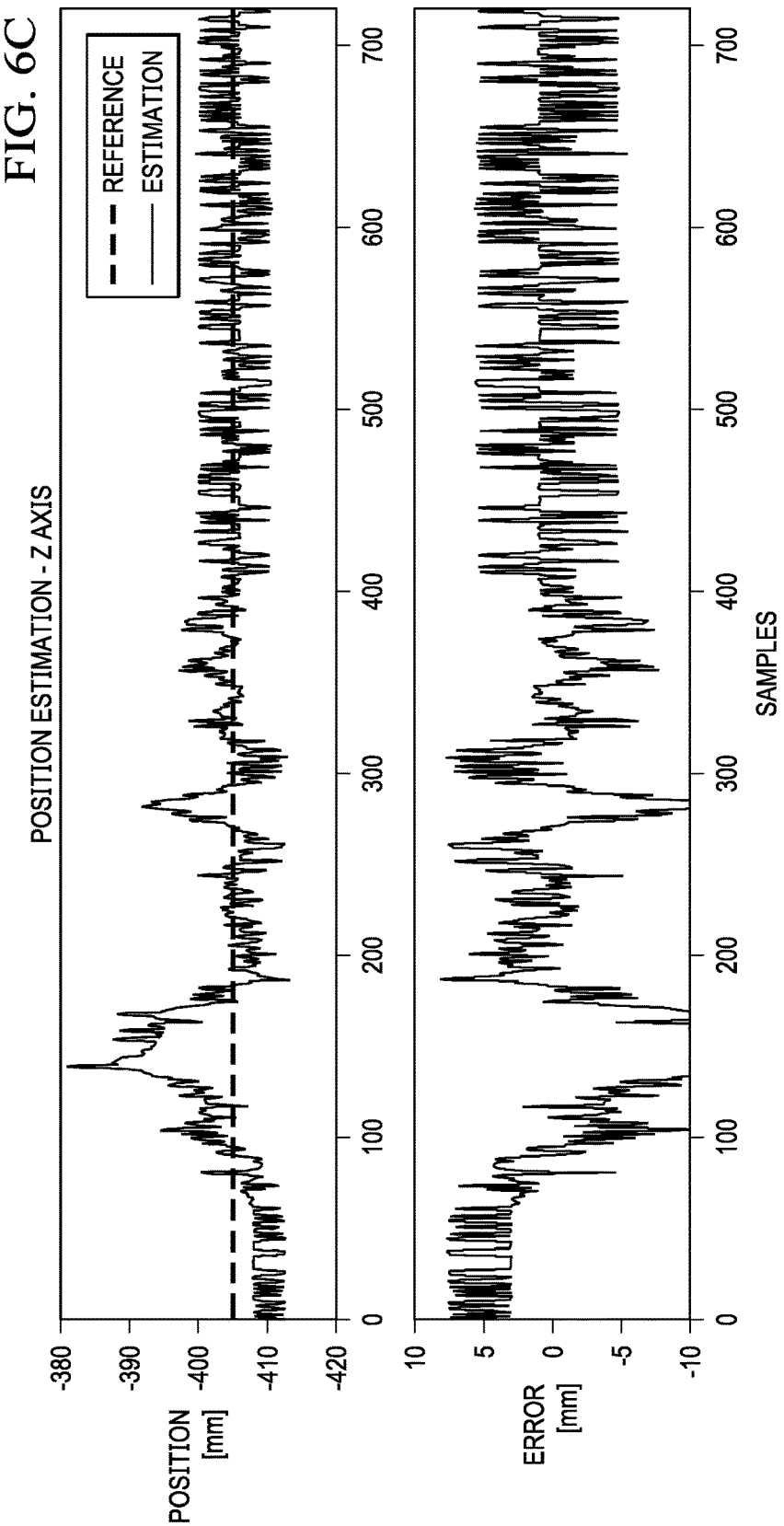

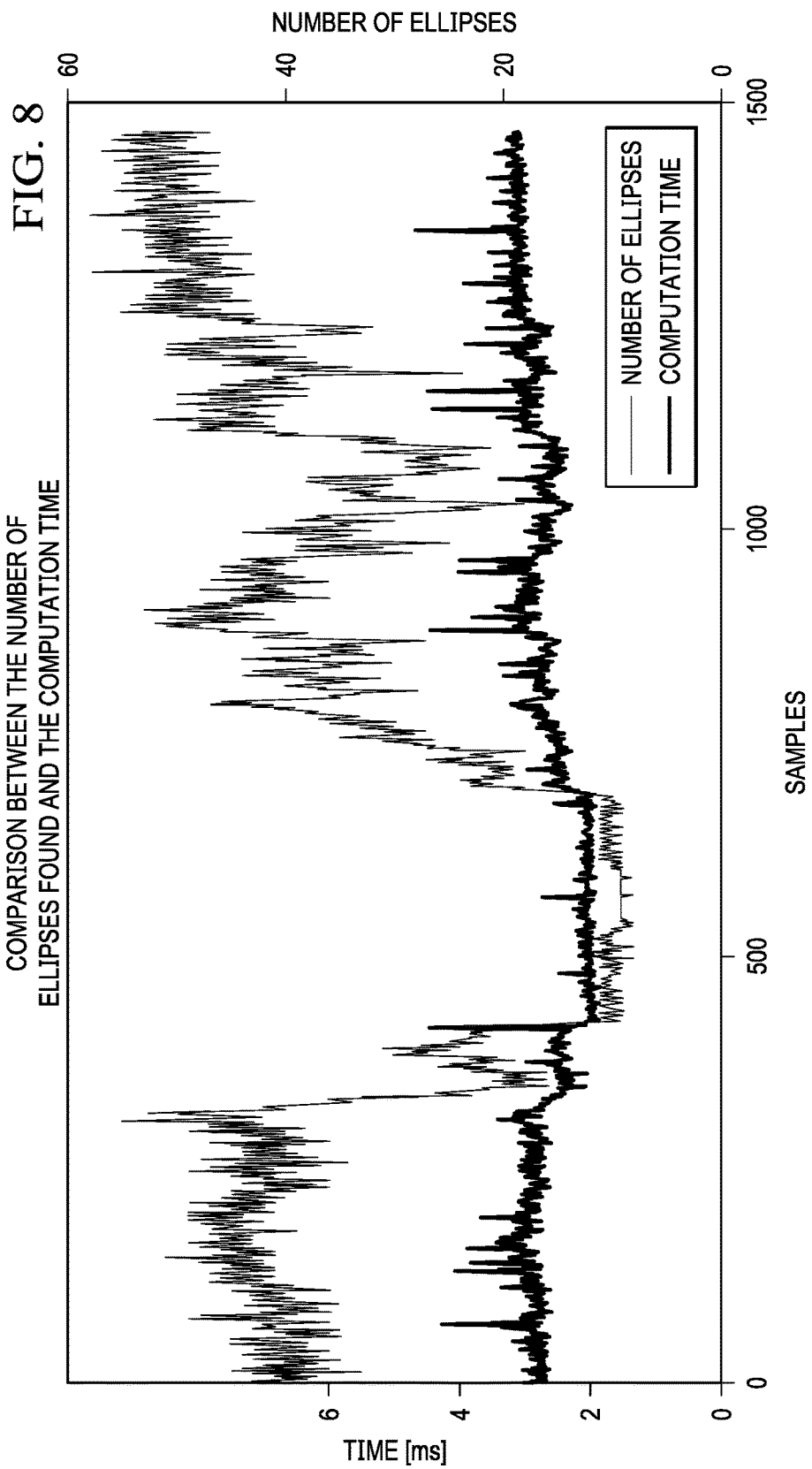

US 10,540,782 B2

IMAGE PROCESSING FOR POSE ESTIMATION

PRIORITY

This application claims priority to U.S. Provisional Application No. 62/422,524, filed Nov. 15, 2016 entitled IMAGE PROCESSING FOR POSE ESTIMATION, the disclosure of which is incorporated herein by reference in its entirety.

GOVERNMENT SUPPORT CLAUSE

This invention was made with Government support under Contract No. CNS-1229236 awarded by the National Science Foundation. The Government has certain rights in the invention.

FIELD

The present disclosure relates generally to systems and methods for using image processing to estimate the pose of a moving object in relation to another object. Specifically, but without limitation, the disclosure relates to using GPU-based image processing in conjunction with a pre-defined marker for pose estimation of Unmanned Aerial Vehicles (UAV) to enable the autonomous orientation thereof.

BACKGROUND

Fully-autonomous operation, including autonomous take-off and landing, of helicopters and multi-rotor UAVs requires the implementation of a variety of sensory, communication, and processing capabilities. One way UAVs can autonomously take off and land autonomously is to start and finish missions at a known location or landing surfaces utilizing fixed markers for visual or sensory orientation.

In particular, takeoff and landing autonomously requires a precise estimation of the UAV pose (i.e., the three-dimensional position in space) in relation to a landing marker that cannot typically be accomplished with satellite-based navigation systems or other on-board sensors at the precision and framerate required by flight control systems.

Visual sensors can be successfully used during the landing process since they are able to provide the pose with an accuracy typically greater than GPS, sufficient to complete the autonomous landing task. However, vision data provide a considerable amount of information that must be processed. In fact, data provided by visual sensors have two main drawbacks: first, the computation time required to analyze and extract information from each frame reduces the rate at which the sensor can provide information; second, the computation time is typically dependent on the complexity of the image (frame) and on the number of operations that have to be performed. Therefore, providing a high-frequency pose estimation becomes mandatory for more precise localization and control performance especially during takeoff and landing, and a need exists for improved systems and methods to achieve such performance.

SUMMARY

An aspect of the present disclosure provides a method for estimating a pose of a first object in relation to a second object, the second object comprising a visual marker comprising a plurality of ellipses. The method may comprise capturing a video image of the visual marker with an image capture device on the first object, then pre-processing frames of the video image on a graphics processing unit. The method may then comprise detecting the visual marker by finding contours in the frames to identify the plurality of ellipses and determining that a pattern of the plurality of ellipses match a known pattern of the visual marker. Then the method may comprise obtaining coordinates of two or more of the plurality of ellipses of the visual marker, estimating the pose of the first object in relation to the second object by inputting the coordinates of the plurality of ellipses into a pose estimation algorithm, and filtering results of the pose estimation algorithm.

Another aspect of the disclosure provides a system for estimating a pose of a first object in relation to a second object having a visual marker. The system may comprise a central processing unit a graphics processing unit, and an image capture device. The system may be configured to capture a video image of the visual marker with an image capture device on the first object, then pre-process frames of the video image on a graphics processing unit. The system may be further configured to detect the visual marker by finding contours in the frames to identify the plurality of ellipses and determine that a pattern of the plurality of ellipses match a known pattern of the visual marker. Then the system may be further configured to obtain coordinates of two or more of the plurality of ellipses of the visual marker, estimate the pose of the first object in relation to the second object by inputting the coordinates of the plurality of ellipses into a pose estimation algorithm, and filter results of the pose estimation algorithm.

Yet another aspect of the disclosure provides a non-transitory, computer-readable storage medium, encoded with processor readable instructions to perform a method for estimating a pose of a first object in relation to a second object having a visual marker comprising a plurality of ellipses. The method may comprise capturing a video image of the visual marker with an image capture device on the first object, then pre-processing frames of the video image on a graphics processing unit. The method may then comprise detecting the visual marker by finding contours in the frames to identify the plurality of ellipses and determining that a pattern of the plurality of ellipses match a known pattern of the visual marker. Then the method may comprise obtaining coordinates of two or more of the plurality of ellipses of the visual marker, estimating the pose of the first object in relation to the second object by inputting the coordinates of the plurality of ellipses into a pose estimation algorithm, and filtering results of the pose estimation algorithm.

BRIEF DESCRIPTION OF THE DRAWINGS

FIG. 4A shows a top graph of position estimation of a camera and position feedback provided by the testing system along an x-axis and a bottom graph of error rates between the measures in the top graph.

FIG. 4C shows a top graph of position estimation of a camera and position feedback provided by the testing system along a z-axis and a bottom graph of error rates between the measures in the top graph.

FIG. 5 is a graph of yaw angle estimation of the pose estimation system in experiments.

FIG. 6A shows a top graph of position estimation of another camera and position feedback provided by the testing system along an x-axis and a bottom graph of error rates between the measures in the top graph.

FIG. 6C shows a top graph of position estimation of another camera and position feedback provided by the testing system along a z-axis and a bottom graph of error rates between the measures in the top graph.

FIG. 8 shows a graph comparing the number of ellipses found by a camera and the computation time required by the pose estimation system in experiments.

DETAILED DESCRIPTION

Figure 1B:
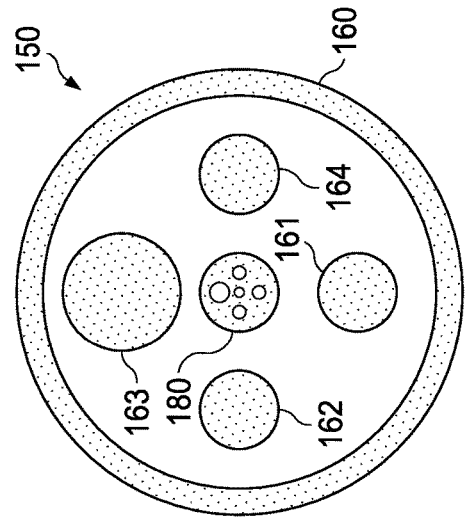
FIG. 1B shows an exemplary visual marker that can be processed by the pose estimation system for accurate landing.

An aspect of the present disclosure provides a system for marker-based pose estimation of a UAV using visual information captured by an image capture device, and GPU-based image processing, in order to perform precise autonomous orientation for applications of the UAV, including landing. In embodiments of the present disclosure, a distinct visible marker on a landing surface may be used to enable visual detection of the landing surface by a camera on a UAV. One or more algorithms may be used to detect and process the existence of the marker and then calculate the pose of the UAV. The processing may be performed on-board the UAV by a graphics processing unit (GPU). An advantage exists in the use of a GPU for detecting the marker, in order to achieve on-board high-frequency pose estimation and marker detection in cluttered environments. In other words, it is desirable to detect the presence of a landing marker in a landing environment where there are many other visible distractions that could obscure the marker. In order to detect the correct landing marker in such an environment, a large amount of visual data may need to be processed. Processing large amounts of data due to high frequency detection methods on-board a small or miniature UAV can be problematic. However, the use of the GPU for image filtering and marker detection may provide an upper bound on the required computation time regardless of the complexity of the image. Experiments to test embodiments of the disclosure show that the one or more algorithms provided herein are able to provide pose estimation with a minimum framerate of 30 fps and an image dimension of 640×480 pixels.

Although there are many current approaches for estimating pose, the use of GPU for real-time, on-board image processing is still limited. Most applications rely on CPU-based systems, some others leverage a more powerful ground control station to process the stream video.

The approach of the present disclosure, in contrast to the state of art, exploits the use of an on-board GPU-based embedded system (e.g., an nVidia® Jetson TK1) for precise pose estimation with real-time performance, using a pre-defined marker. Other GPUs may be used in embodiments without departing from the scope of the present disclosure. The present disclosure exploits the GPU not only for its ability to perform image processing but also for its ability to perform parallel computation, which is useful in order to distinguish the marker even in cluttered environments. "Cluttered" environments refers to visual fields in which the marker exists alongside other similar visual elements; in such environments, a large amount of processing capability may be required to distinguish the visual landing marker from other distractions. This capability is important because in order for a UAV to be fully autonomous, it must be able to take off and land with minimal error even in difficult environments. The major components of the system of the present disclosure include an embedded computer (processor) with integrated parallel image processing on board with low power requirements; a camera with an anti-vibration system, a high frame rate, and high resolution; an asymmetric fiducial marker for 6 DOF (degree of freedom) pose estimation; and pose estimation software. Each component will be described in detail throughout the disclosure.

An embodiment of the marker used for pose estimation in the present disclosure is a design based on a series of circles organized such that is possible to estimate the 6 degrees of freedom (DOF) of the camera. The pose estimation is carried out using the pin-hole model and the intrinsic parameters of the camera, obtained through a calibration procedure. In the embodiment of the marker shown in the figures, the center of the marker contains a replication of the marker itself, which is used to estimate the pose when the camera is close to the landing pad. Aspects of the disclosure specifically utilize markers having ellipses, and more specifically, circles, for reasons that will be described in further detail. However, other embodiments of the disclosure may utilize different marker designs, including those that do not use ellipses.

Figure 1A:
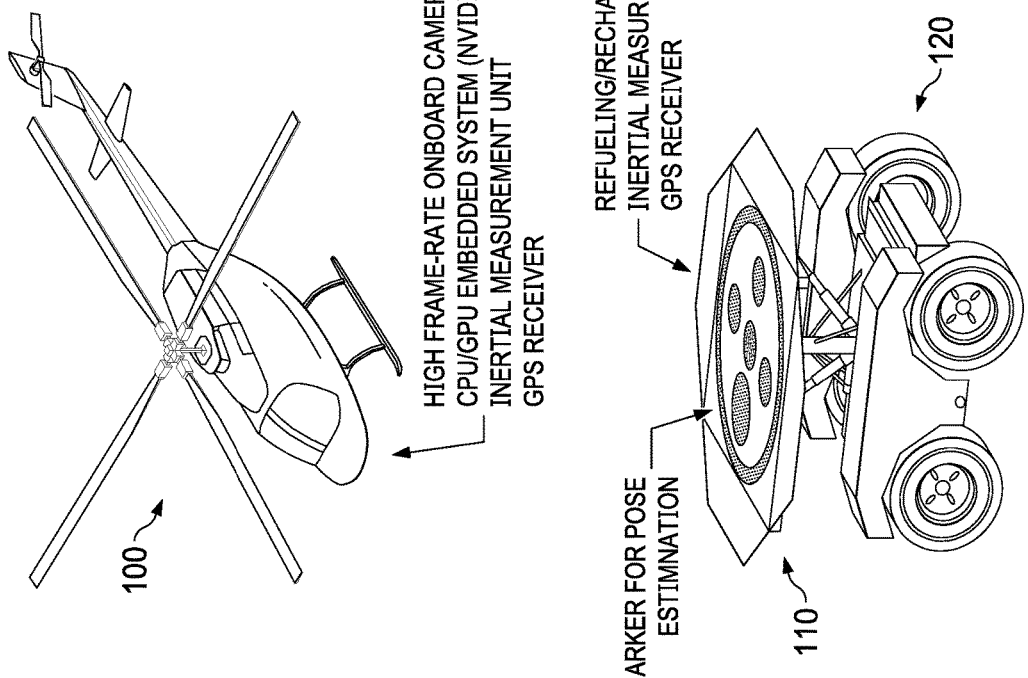
FIG. 1A shows a UAV equipped with a pose estimation system of the present disclosure and a mobile landing platform for the UAV

The system for autonomous landing is based on the detection of a predefined marker, the dimensions of which are known a priori. FIG. 1A shows an exemplary UAV 100 equipped with a pose estimation system of the present disclosure. For the purposes of the present disclosure, the term "pose estimation system" may be understood to mean an image capturing device and a graphics processing unit that implements one or more algorithms described herein. The pose estimation system is used in conjunction with a visual marker, but the term "pose estimation system" may or may not refer to the visual marker itself. FIG. 1A also shows a landing platform 110 mounted on the top of a self-leveling mobile ground robot 120. This is an example of a visual marker being used as a landing target. In many UAV use cases, landing in a very precise location—within centimeters or even millimeters of a target—is required. For example, the ground robot 120 may be a charging station for the UAV, and a charge connection may only be made if the UAV lands in the correct spot. The marker 150 itself in the present embodiment is shown in FIG. 1B. As shown, it is composed of a series of circles that facilitates the pose estimation of the helicopter with respect to the middle of the marker, defined by an inner marker 180. The pose estimation is, then, provided as input to the control system in order to let the helicopter land at the center of the marker.

As depicted in FIG. 1B, the main structure of an exemplary marker comprises two concentric circles, including an "outer circle" 160 and an "inner marker" 180. The area between the outer circle 160 and the inner marker 180 has four circles 161-164 used for the pose estimation of a camera mounted on the UAV 100. Throughout the disclosure, the two concentric circles 160 and 180 may be referred to as the "main structure" of the marker while the four inner circles 161-164 may be referred to as "inner ellipses." The inner marker 180 itself is a replication of the main structure marker plus inner ellipses in miniature, with opposite colors. This inner marker 180 allows the pose estimation system of the UAV 100 to be used even during the last stage of the landing phase, when the camera is close to the landing surface. In particular, the processing and algorithms that the pose estimation system uses to identify the marker from far away can also be used to identify the inner marker 180 close-up.

Figure 2A:
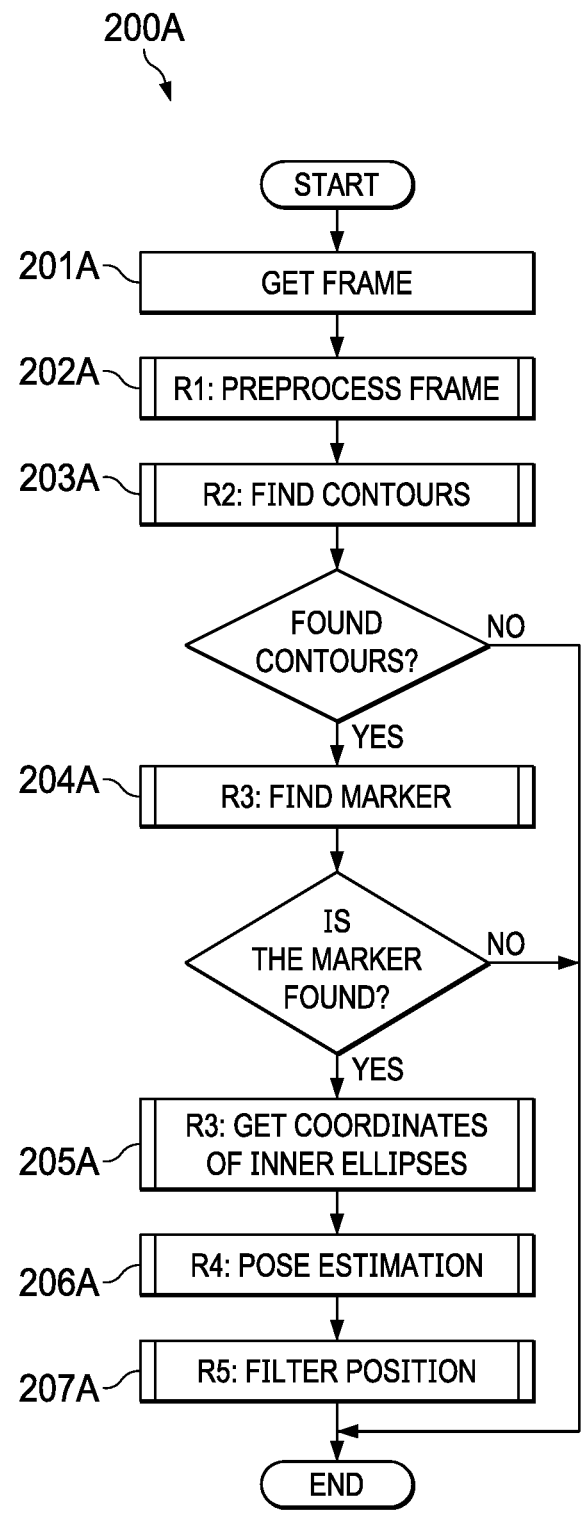
FIG. 2A shows a flowchart of a method for pose estimation according to the present disclosure.

FIG. 2A a high-level flow chart of an algorithm 200A of the present disclosure, which may be implemented once images are captured by an image capture device mounted on the UAV. Some aspects of the algorithm may be implemented through open-source code that is currently available (e.g., from a library such as OpenCV), or alternatively, may be implemented by original code. The main steps that the algorithm 200A comprises can be summarized as follows:

At step 201A, an individual frame from a captured image is received. At step 202A, frame pre-processing takes place. Frame preprocessing is carried out on the GPU and comprises applying filtering algorithms (which will be described in more detail in subsequent flowcharts, in order to reduce any "noise" (i.e., unwanted signals) before detecting the contours of the objects, which takes place at step 203A. After uploading the current frame to the GPU memory, preprocessing (at step 202A) generally involves the image being converted to gray scale and blurred in order to reduce the noise. Then, the processed frame is used as input for a software function that detects edges and contours within a frame (e.g., a Canny edge detection routine). In some embodiments, the resulting pre-processed frame is downloaded back to the CPU memory for contour searching, when a CPU is better suited to perform such a function. It is contemplated that contour searching may be implemented in a GPU in some embodiments.

The contour detection at step 203A may be implemented at the CPU using the findContour function provided by the OpenCV library with the flag RETR_CCOMP. This flag retrieves all the contours and arranges them on a 2-level hierarchy: external contours of the object (i.e., its boundary-) are placed in hierarchy-1, while inner contours are placed on hierarchy-1. All the contours belonging to the hierarchy-1 and with at least 6 vertices are placed to the list foundEllipses, which will be described with respect to FIG. 2B.

If contours are found in step 203A, the algorithm continues with step 204A to execute a Find Marker Routine. In this step, the list foundEllipses is uploaded to the GPU in order to detect the marker, which will be described further with respect to FIG. 2C.

If the marker is found, the algorithm continues with step 205A and detect the coordinates of the inner ellipses. If the marker is found, this routine will estimate the coordinates of the four inner ellipses. These coordinates will be used for the pose estimation function.

Then at 206A, pose estimation takes place. The coordinates of the four inner ellipses, along with the information about the structure of the marker, are passed as input to a pose estimation function. In some embodiments, this function may be based on the solvePnPRanscac function provided by the OpenCV library. In embodiments of the algorithm 200A, the GPU-based version of solvePnPRanscac may be used. However, other pose estimation functions may be used without departing from the scope of the present disclosure.

At step 207A, pose filtering takes place. The pose estimation provided by the PnP algorithm in step 206A is filtered in order to reduce the noise but also to provide an estimation when the marker is not detected, which will be described with respect to FIG. 2D. The filtering algorithm is based on the extended Kalman filter and it allows to estimate the camera pose also during occlusions and vibrations.

Figure 2B:
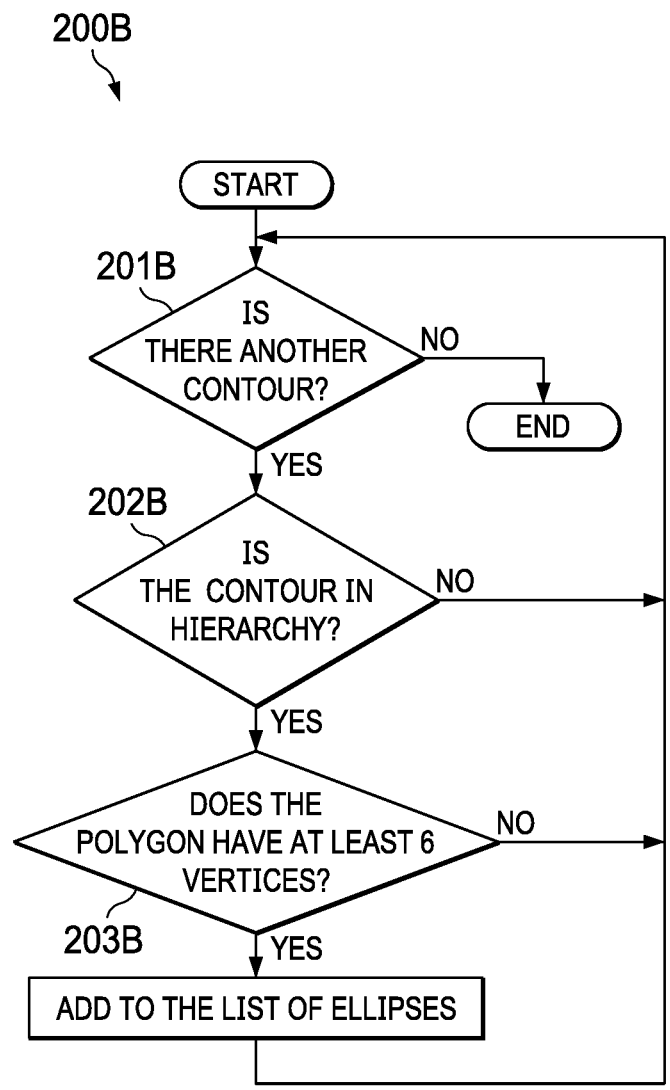
FIG. 2B shows a flowchart of a method for detecting contours and ellipses according to the present disclosure.

FIG. 2B shows a method 200B for the step of finding contours as described in step 203A of FIG. 2A. As previously mentioned, this process of finding contours may be executed by instructions at a CPU via open source functions, or may be implemented by uniquely programmed functions. At step 201B, the method comprises finding a contour. Then, at step 202B, the method comprises determining if the contour is in one of the two hierarchies (hierarchy-1 for external contours or hierarchy-2 for internal contours, as described with reference to FIG. 2A). Step 202B informs if the contour is a polygon, and at step 203B, the method determines if the polygon has at least 6 vertices. If it does, the program considers the contours comprising the polygon to be an ellipse, and adds it to the list of found ellipses. The CPU may process the rest of the frame repeatedly until it has found all the possible contours in the frame.

Figure 2C:
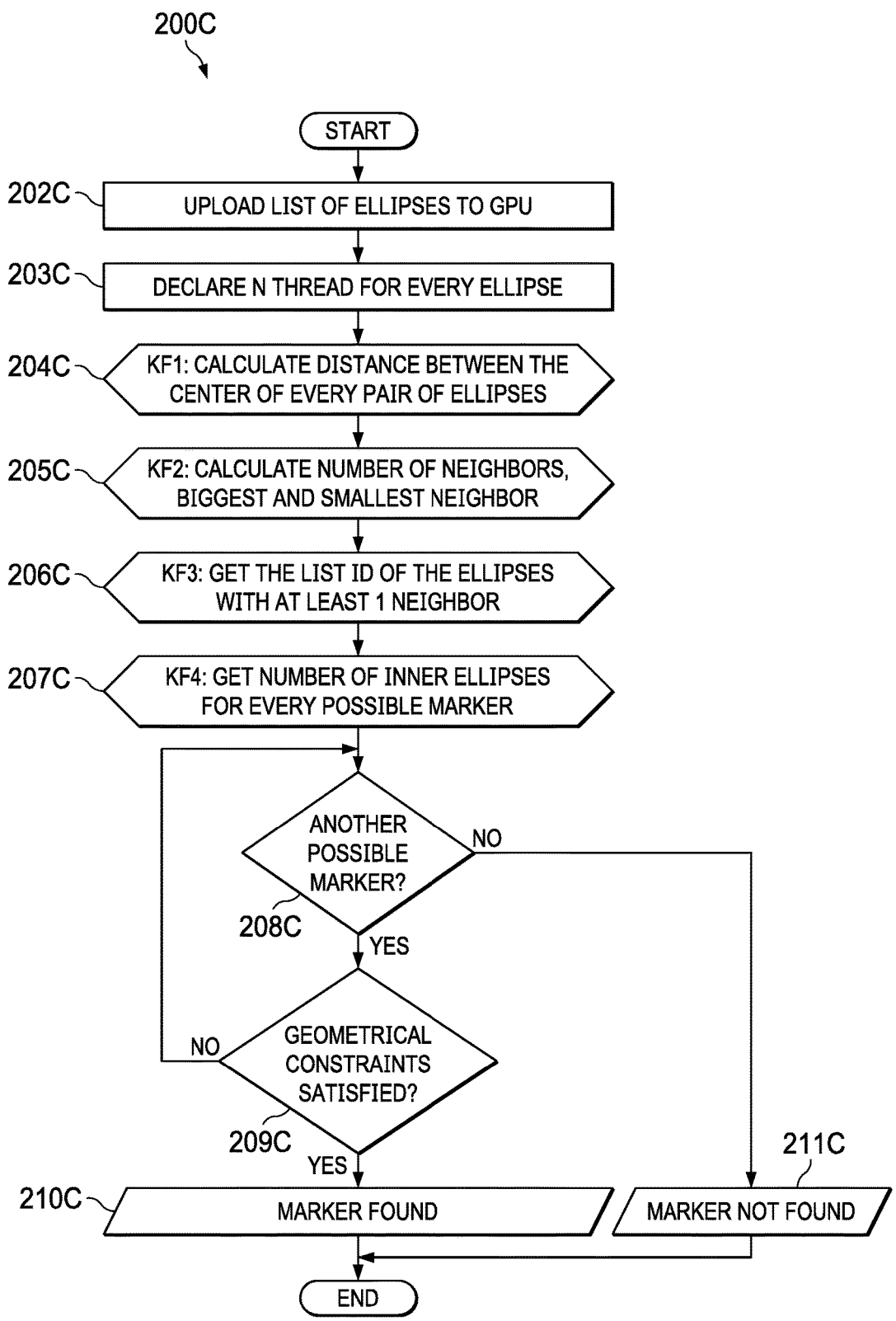
FIG. 2C shows a flowchart of a method for identifying a particular visual marker according to the present disclosure.

FIG. 2C shows steps of a marker detection method 200C that takes place on the GPU. The detection of the marker may take place in two different stages: search of the main structure of the marker, as described in steps 202C-206C, and detection of inner ellipses, as described in steps 207C-210C. The method described herein allows the pose estimation system to determine whether a particular set of ellipses fits a pattern matching a particular marker. That is, the pose estimation system has, as a reference, an existing marker pattern (e.g., the marker shown in FIG. 1B), and compares the found ellipses to see it fits the existing marker pattern. The method of marker detection further allows the system to see other ellipses that are not part of the marker and distinguish them from the marker.

At step 202C, the input of the GPU-based marker detection routine 200C comprises the list of all the ellipses found in the current frame via the processing that has previously taken place on the CPU in method 200B of FIG. 2B. The marker detection algorithm on the GPU may comprise the five steps described as follows. The detection of the main structure of the marker is carried out using a dedicated GPU kernel function, which is designated in steps 204C-207C with the letters "KF." The GPU kernel will search all the sets of concentric ellipses evaluating all the possible combinations between the ellipses provided as input. The evaluation of all the possible combinations is carried out on the GPU declaring a number of threads, as shown in step 203C, equal to the square of the number of ellipses found ($n^2$), as described from the algorithm 1, written below in pseudocode:

---
Algorithm 1 List of neighbors for every ellipse
---
```
1:  procedure FIND NEIGHBORS
2:      for each ellipse E_i do
3:          Instantiate a row of n threads on the GPU
4:          for each ellipse E_j ≠ E_i do
5:              if distance(E_j, E_i) ≤ Threshold then
6:                  Add E_j to the list of neighbors of E_i
7:              end if
8:          end for
9:      end for
10: end procedure
```
---

On the GPU kernel function in step 204C, comparisons are done between the generic ellipse Ei and the ellipse Ej is carried out by a dedicated thread in order to calculate the distance between the center of every pair of ellipses. Therefore, all the comparisons between all the ellipses are made simultaneously: no "for" loops are required to make all the comparisons. The output of this kernel function will provide a matrix where for each ellipse Ei, a list of all the ellipses concentric with Ei is memorized. This step 204C calculates the distance between ellipses. The concentric ellipses with Ei may be referred to as "neighbors" of ellipse Ei. Every ellipse is concentric with itself. Furthermore, if the ellipse Ei is concentric with Ej, then the converse is also true. This leads to a symmetric matrix. If a pair of ellipses (Ei; Ej) are concentric, a 1 will be memorized in the position (i; j), otherwise a 0 will be memorized. In other words, this step 204C determines if ellipses can be considered "neighbors."

The output of this routine 204C is the list of all sets of concentric ellipse candidates to be possible markers. That is, if ellipses are neighbors, it is possible that they are part of the marker the GPU is searching for. Each row of this matrix with a number of 1 elements 2 describes a possible marker. This list will be provided in input to the second stage of the algorithm, in order to detect the real marker and estimate the pose of the helicopter. In order to detect the inner ellipses for every possible marker, we first need to estimate the area on which the inner ellipses should be present. This is done by detecting, for every ellipse $E_i$, the neighbor with the smallest and the biggest area, as described in step 205C Since those ellipses are concentric (as evaluated by the previous phase 204C), the center of every inner ellipse, if present, must be contained in the area bounded by these two ellipses. The search of the smallest and biggest ellipse corresponds to the search of the ellipses with the minimum and the maximum area. The search of maximum and minimum of a vector in a GPU kernel can be easily carried out using a known reduction algorithm. After the detection of the smallest and biggest area, the algorithm proceeds counting the number of inner ellipses, at step 206C, for every set of concentric ellipses. At this stage, if a marker is in the field of the camera's vision, one set (and only one set) of ellipses should contain four inner ellipses, indicating the presence of the marker. The typical output of this stage will be one set of ellipses corresponding to the marker, at step 207C. Each ellipse, though is evaluated through steps 202C-207C, so for those ellipses that do not meet the rules, they are eliminated as other possible markers. That is, at step 208C, ellipses may not have neighbors, which will result in an output of "marker not found" 210C. Or, at step 208C, ellipses do have neighbors, in which case the distance between the ellipses and their sizes must be evaluated again, at step 209C. This phase is also implemented on the GPU in a way similar to the one described previously, in steps 204C-207C. At step 209C, if the ellipses do not meet the constraints, a marker is not found. If the ellipses do meet the constraints of a marker, though, a marker is found in 210C. However, if there is only one actual marker, only one marker will be found.

As shown in FIG. 1A, the exemplary marker of the present disclosure has four inner ellipses, but the top inner ellipse 163 is larger than the other three inner ellipses 161, 162, and 164. The varying sizes of these ellipses may be used to identify the top of the ellipse to allow the pose estimation system to orient itself as desired. For example, a UAV equipped with the pose estimation system may need to land with a particular orientation with respect to the marker, such as with the front of the UAV aligned with the "top" of the marker designated by the largest ellipse. This may be desirable in applications for charging a UAV or delivering a payload.

The detection of the largest ellipse may be implemented using the marker candidate produced as output of the previous routine. An algorithm may start evaluating the orientation of the four inner ellipses. In order to estimate the orientation, the algorithm searches for the inner ellipse with the biggest area, and then continues searching for the remaining three inner ellipses. The different dimension of the inner ellipses is necessary in order to make the marker asymmetric and estimate not only the position of the camera with regard to the center of the marker but also its orientation (in terms of roll, pitch and yaw angles).

Referring back to FIG. 1A, the inner marker 180 comprises a replica of the main marker 150 (e.g., another miniature set of a large top ellipse, three smaller ellipses, and a center ellipse). As shown, the colors of the inner marker 180 are inverted in comparison to the main marker 150. The pose estimation system can use algorithms to distinguish between the inner marker 180 and the main marker 150. In some embodiments, a simple algorithm based on the color of the center of the biggest inner ellipse is used in order to detect the outer/inner marker (see Algorithm 2 below).

---
Algorithm 2 Detection of Outer/Inner Marker
---
```
1: procedure INNER/OUTER MARKER DETECTION
2:     Get RGB of the center of the bigger inner ellipse
3:     Calculate the mean value  μ = (R + G + B) / 3
4:     if μ ≤ 125 then
5:         Inner Ellipse
6:     else
7:         Outer Ellipse
8:     end if
9: end procedure
```
---

In order to have a transition from the outer marker to the inner marker and vice-versa, the algorithm may have to detect the new condition for at least 10 consecutive frames. The inner marker 180 may be the only one visible within the field of view of the camera when the pose estimation system gets very close to the main marker 150, and may be used to estimate pose when the system is very close. In UAV embodiments, the inner marker 180 may be used for fine adjustments for landing.

The pose estimation itself may be carried out comparing the coordinates of the centers of the four inner ellipses with the information provided in input of the algorithm. The comparison may be carried out through the GPU-based function solvePnPRansac, available as part of the OpenCV libraries, or other similar functions may be used. The output of this function is the current pose of the camera with respect to the center of the marker. The solvePnPRansac function is based on the pinhole camera model known in the art. In this model, each point of the view is formed by projecting each image point into the corresponding image plane point using a perspective transformation (eq.1):

$$sm = A[R/t]M$$

The matrix A contains the coefficients ($c_x$; $c_y$) and ($f_x$; $f_y$) representing, respectively the coordinates of the principal point, that is usually at the image center, and the focal lengths expressed in pixel units. These coefficients are estimated experimentally through the calibration procedure of the camera. The matrix is used to describe the camera pose with respect to a static scene.

Figure 2D:
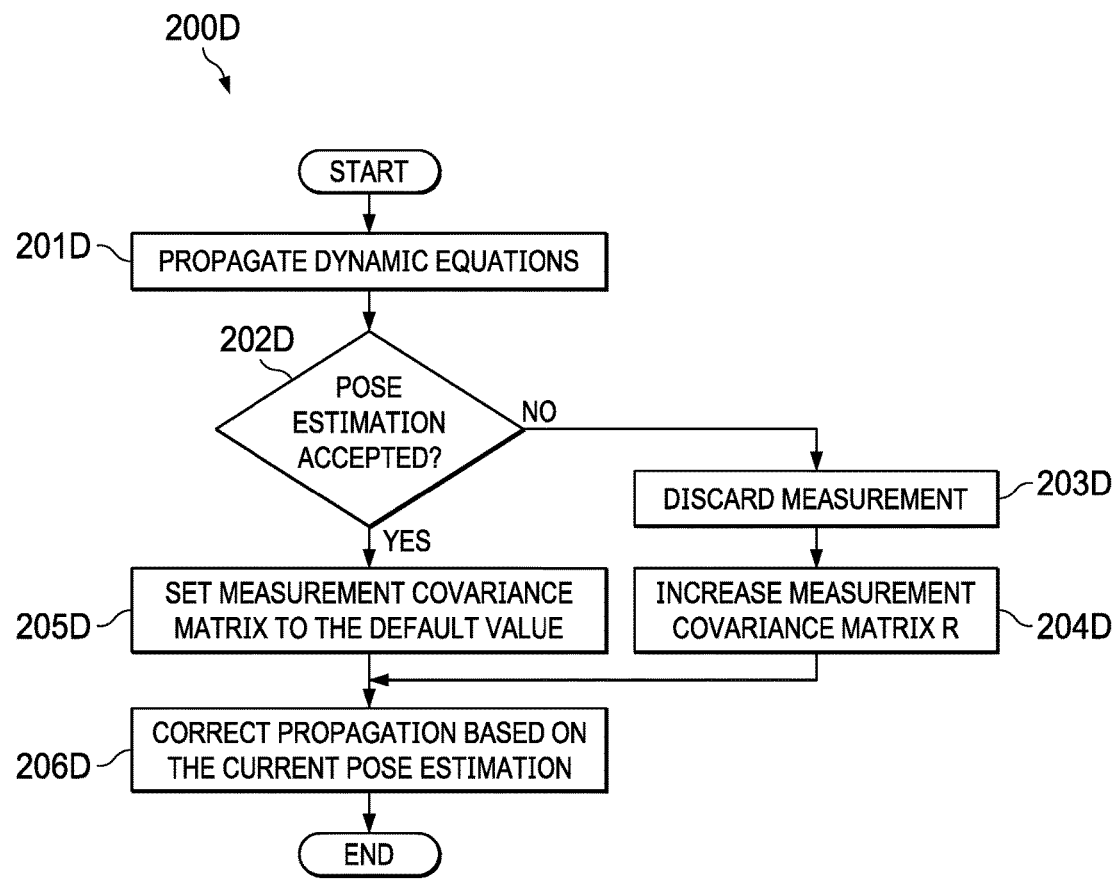
FIG. 2D shows a flowchart of a method for increasing the accuracy of pose estimation.

Pose Estimation Filtering may be implemented by using the output of the pose estimation algorithm and filtering it using a discrete extended Kalman filter. Steps of the pose estimation filtering are shown in FIG. 2D, which is done in order to reduce the noise on the pose estimation when the camera is subject to vibrations and provide an estimation of the pose when the camera is occluded. In general, at step 201D, the algorithm propagates dynamic equations. If the pose estimation is accepted at step 202D, the measurement covariance matrix is set to the default value, at step 205D. If the pose estimation is not accepted at step 202D, the measurement is discarded at 203D, then the measurement covariance matrix R is increased at step 204D. Then, at step 206D, the correct propagation is based on the current pose estimation.

Figure 3A:
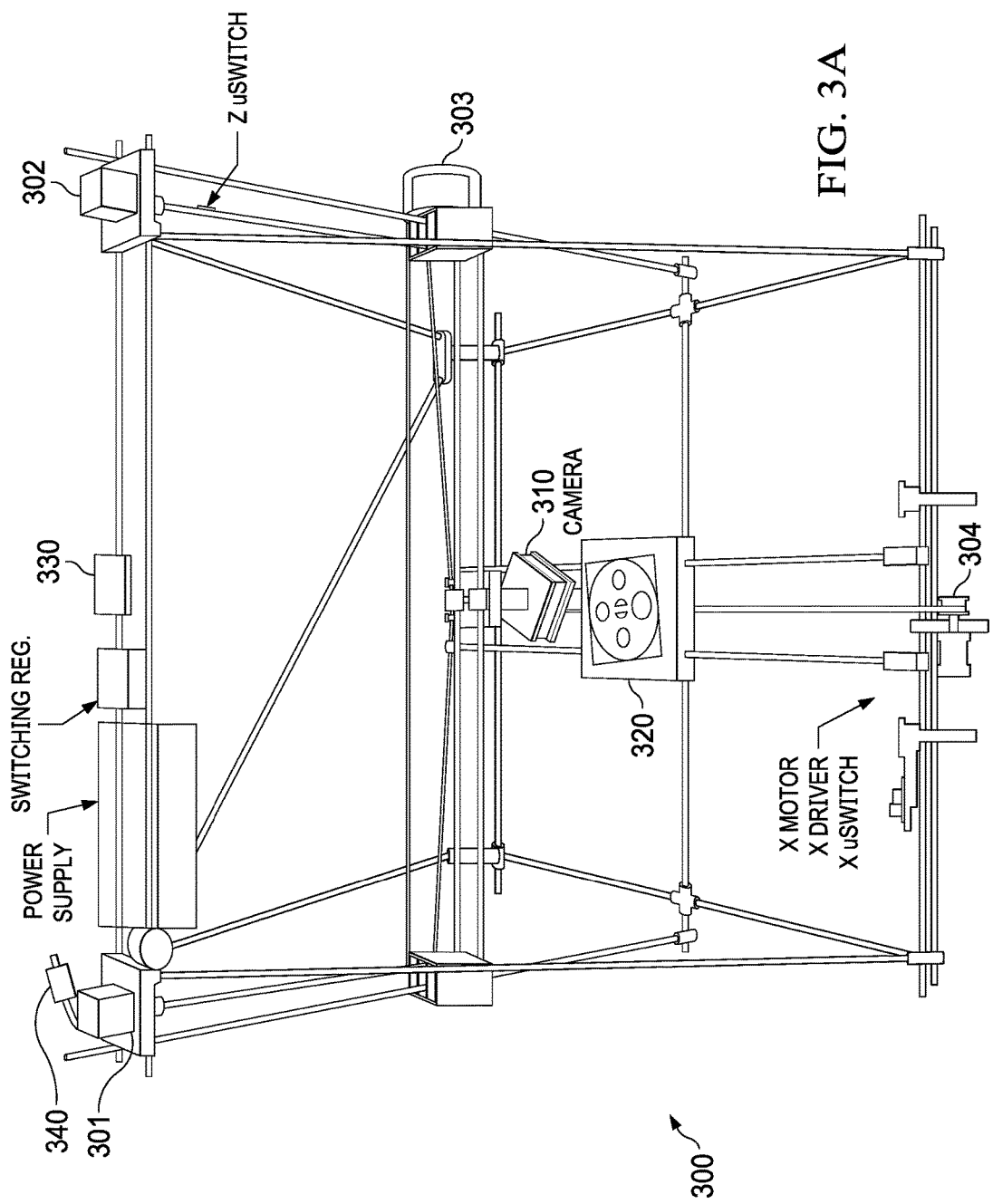
FIG. 3A shows a structure built to experimentally test the pose estimation system of the present disclosure.

More specifically, the state vector is represented by the pose and velocity with regard to the marker (eq. 2):

$$x(t) = [x\ y\ z\ \dot{x}\ \dot{y}\ \dot{z}\ \varphi\ \theta\ \psi\ \dot{\varphi}\ \dot{\theta}\ \dot{\psi}] \quad (2)$$

where (x, y, z) represents the translation of the camera and ($\varphi$, $\vartheta$, $\psi$) represents the attitude. The states (x, y, z, $\varphi$, $\vartheta$, $\psi$) are observable. The covariance measurement matrix has been evaluated experimentally through static measurements. In particular, an extended data acquisition with the camera standing on a fixed point above the marker (using an xFrame machine, as shown in FIG. 3A, which will be described presently) has been performed. The variance of each measurement has been evaluated and used as the default value for the corresponding state variable (eq. 3):

$$\begin{bmatrix} \Sigma_{xyz} & O_{3\times3} & O_{3\times3} & O_{3\times3} \\ O_{3\times3} & O_{3\times3} & \Sigma_{\varphi\theta\psi} & O_{3\times3} \end{bmatrix} \quad (3)$$

The triad $\Sigma_{xyz} = (\sigma^2_x, \sigma^2_y, \sigma^2_z)$ represents the variance of the position of the camera along x,y, and z axes while $\Sigma_\varphi = (\sigma^2_\varphi, \sigma^2_\psi, \sigma^2_\psi)$ is the variance of the roll, pitch, and yaw angles respectively. The estimated variance for the six observable state variables is $\sigma^2 = (0.01)^2$ mm$^2$. When the marker is not detected or the pose estimation is discarded, the diagonal elements of the R matrix are increased by a constant, k, $\sigma^2 = k*(0.01)^2$ mm$^2$, where k=100 (this value has been chosen experimentally). When the marker is detected, the diagonal elements are set to their default value.

The algorithms described herein have been evaluated in the lab and then in the field. The following paragraphs described obtained results in on-lab experiments using two different cameras: a Logitech® C625, and an ELP-USBFHD01M-L21 USB camera.

FIG. 3A shows a machine 300 (referred to herein as an "xFrame" machine) designed and built to test the accuracy, performance, and repeatability of a pose estimation system of the present disclosure. The experiments carried out on this machine are described in detail herein. The general design of the experiments were to test how accurately the pose estimation system (in particular, the camera) could estimate its own position in space relative to the visual marker, in comparison to mechanical sensor data that verified the actual position of the pose estimation system camera. Tests were carried out setting the CPU and GPU on a Jetson TK1 from NVIDIA Corp. set to the maximum clock frequency, in order to achieve the fastest possible processing. Through its four-stepper motors 301-304, the machine 300 allows the precise movement of the camera 310 in 3D space, giving the possibility to measure the real position of the camera 310 (via sensors on the motors) with respect to the marker 320 and comparing it with the estimation calculated by the algorithm. The stepper motors 301-304 provide high precision of the movements of the arms of the machine 300 in each axial direction (i.e., up and down, forward and backward, left and right from a given position). The system in the experiments was controlled by an XMOS multicore microcontroller 330 with real-time capabilites and provided current positions of the camera 310 directly to the vision algorithm, using a serial port 340.

Figure 3B:
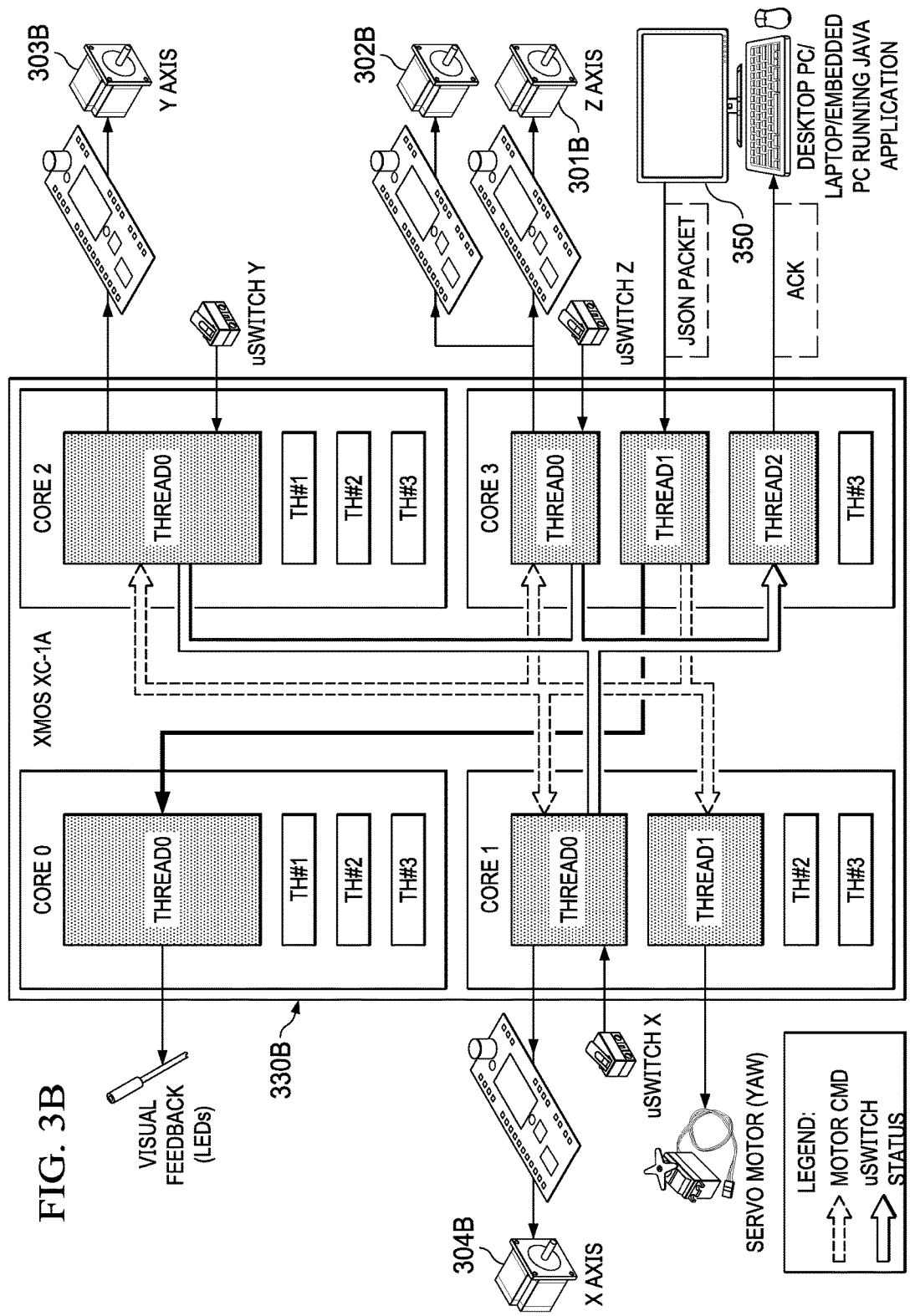
FIG. 3B is a logical block diagram showing inputs and outputs to and from a processor of the pose estimation system.
Figure 3C:
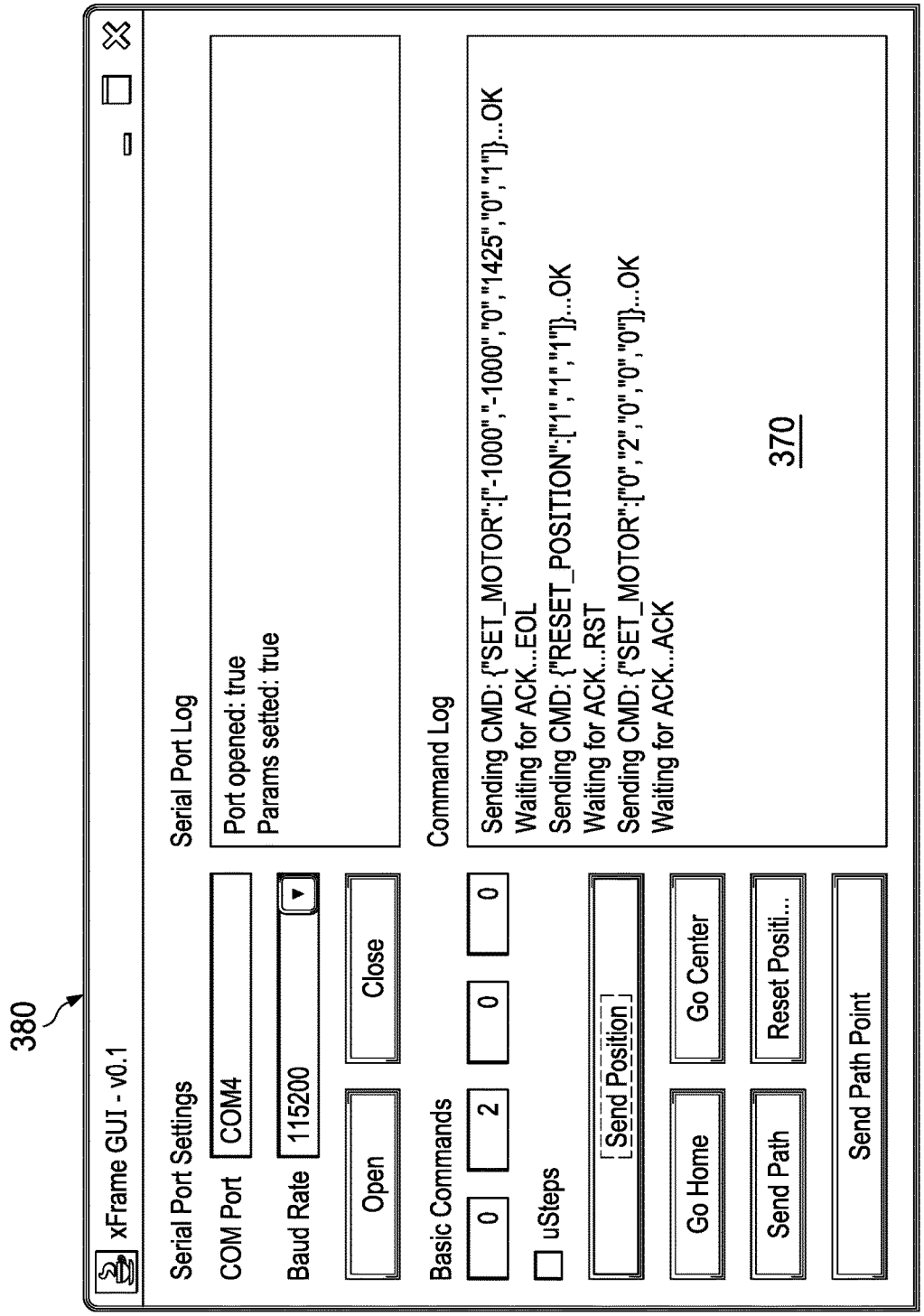
FIG. 3C shows a user interface for inputting commands to an experimental testing machine for the pose estimation system of the present disclosure.

FIG. 3B shows each motor 301B-304B and sensor input to the multicore microcontroller 330B was managed by a dedicated thread in order to parallelize the computations of the positions of the sensors. The machine in the experiments was controlled through a Java GUI 350 which was responsible to communicate with the xFrame in both directions using JSON data format for inputs and outputs, as shown in FIG. 3C. The use of Java allows the portability of the system on every Operating System.

As shown in FIG. 3C, a Java GUI application 380 for controlling the movement of the camera on the xFrame machine provides the following functions: go to home position, go to center, reset position, send path (a list of waypoints to be reached), and move motor specifying the number of rotation or microsteps. As shown in the command log 370, each command sent waits for an acknowledgement before continuing with the next one.

A first test was done with a Logitech C625 camera. Tests were done with more than one type of camera to show that different visual input frames can be used to execute the algorithms of the present disclosure. This particular camera used is a commercial webcam with a narrow angle of view. Different cameras may provide different resolution of frames, which can cause processing requirements to vary, and may have different angles of view, which can affect the distance from which it can detect a marker. Various cameras may offer other advantages and drawbacks, and an important advantage of the pose estimation system of the present disclosure is that it may be used with several types of cameras.

Figure 4B:
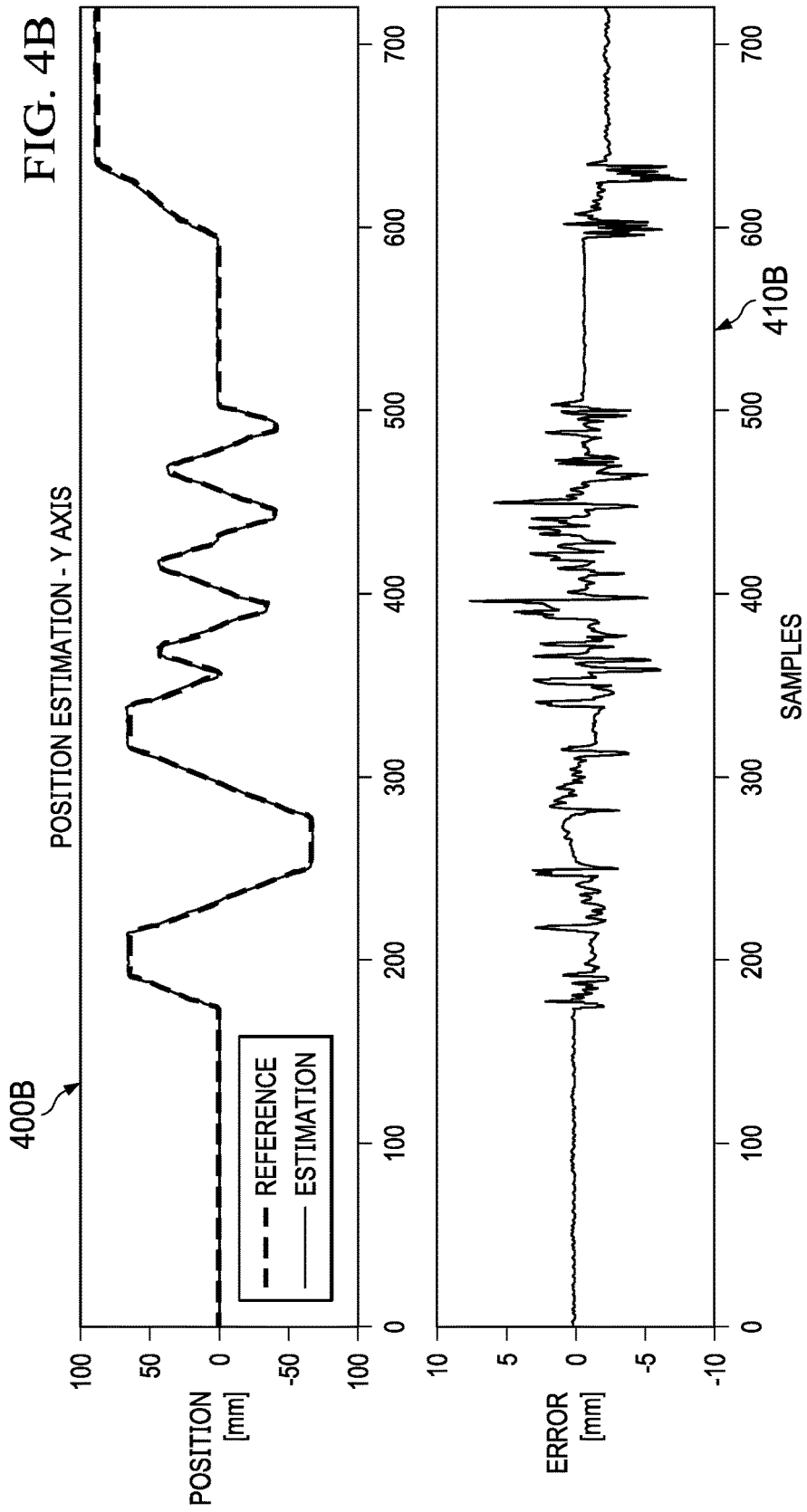
FIG. 4B shows a top graph of position estimation of a camera and position feedback provided by the testing system along a y-axis and a bottom graph of error rates between the measures in the top graph.

FIGS. 4A, 4B, and 4C show the results of the position estimation of the camera compared with the position feedback provided by the xFrame machine on x, y and z axes respectively. As shown in FIG. 4A, in the top graph 400A, the dashed line shows the "reference" position measured by the sensors on the motors, and the solid line shows th "estimation" position provided by the camera and processor executing the algorithms of the present disclosure. The graph shows that both given positions are nearly identical throughout the test as the position varies on the x-axis over time. The lower graph 410A shows the error between the two positions at any given time of the top graph 400A. FIG. 4B shows the comparitive positions in top graph 400B and corresponding error in lower graph 410B for the y-axis, and FIG. 4C shows the comparitive positions in top graph 400C and corresponding error in lower graph 410C for the z-axis. Table II below shows the mean error, standard deviation, max error and RMS for all the three axes. The obtained results show that the algorithm is able to estimate the position of the camera with millimetric accuracy on all the three axes.

It may be noted that all the three axes of the xFrame machine suffers by a constant bias caused by the non-perfect alignment of the camera with the center of the marker. This bias has been estimated experimentally at the beginning of the experiment and removed along all the acquisition. Furthermore, the serial connection used to provide the position of the camera presents a constant delay of 4 samples. In order to calculate the error between the position estimation and the real position, this delay has been removed offline.

TABLE II

Result of position estimation using Logitech C625 camera

|  | $\mu_{Err}$ [mm] | $\sigma$ [mm] | |Max| [mm] | RMS [mm] |
| --- | --- | --- | --- | --- |
| X Axis | 0.19 | 1.34 | 8.006 (5.71%) | 1.35 |
| Y Axis | −0.74 | 1.48 | 7.97 (5.69%) | 1.66 |
| Z Axis | −0.35 | 2.26 | 8.77 (6.26%) | 2.29 |

An additional measure captured by the pose estimation system is yaw of the camera. FIG. 5 shows the yaw estimation of angle throughout the experiment, which was changed over time by rotating the camera from −90 to 90 degrees. The maximum error in the yaw estimation is less than 2 degrees.

Figure 6B:
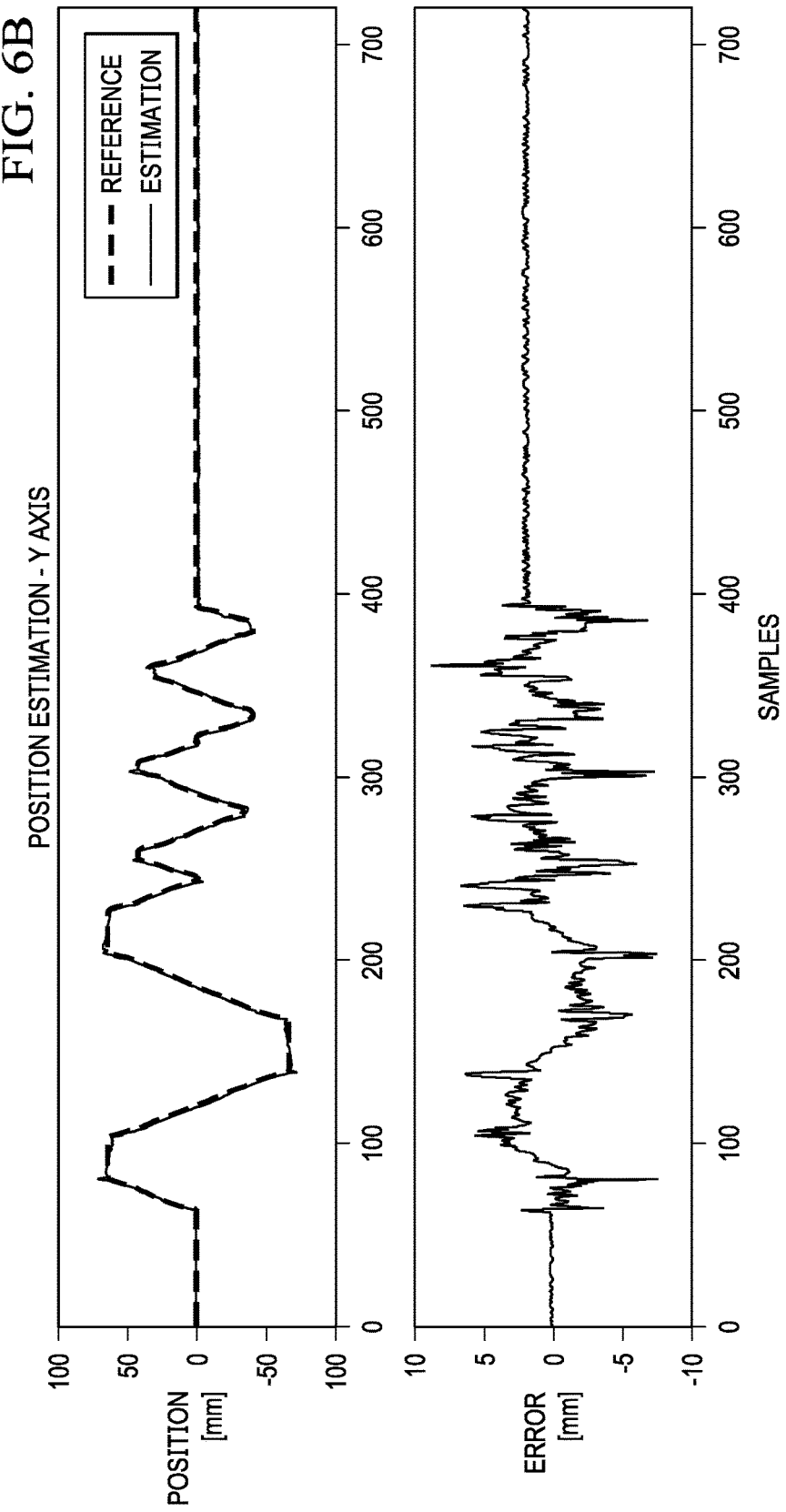
FIG. 6B shows a top graph of position estimation of another camera and position feedback provided by the testing system along a y-axis and a bottom graph of error rates between the measures in the top graph.

In an experiment with a second camera, which was an ELP-USBFHD01M-L21, a USB CMOS board camera module with a 2.1 mm lens and ⅓" sensor dimension, similar results were obtained as with the Logitech C625 camera of the first experiment. FIGS. 6A, 6B, and 6C show the results of the position estimation of the camera compared with the position feedback provided by the xFrame machine on x, y and z axes respectively. Table III below shows the mean error, standard deviation, max error and RMS for all the three axes.

TABLE III

Result of position estimation using ELP-USBFHD01M-L21 Camera

|  | $\mu_{Err}$ [mm] | $\sigma$ [mm] | |Max| [mm] | RMS [mm] |
| --- | --- | --- | --- | --- |
| X Axis | 0.37 | 1.92 | 8.25 (5.89%) | 1.95 |
| Y Axis | 1.22 | 1.79 | 8.73 (6.23%) | 2.17 |
| Z Axis | −4.71 | 4.48 | 8.08 (5.77%) | 4.49 |

Comparing the results shown in Table II and III, the maximum error on the position estimation is around 8 mm for both cameras. The diameter of the marker used for lab test is 140 mm. The maximum error corresponds to less than 8% of the diameter of the marker, but is still greater with this second camera (the ELP-USBFHD01M-L21) than the first camera (Logitech C625) However, the second camera provides a wider field of view allowing the detection of the marker from a farther distance. These experiments show that various types of cameras may be used with pose estimation systems of the present disclosure and still provide highly accurate estimation for landing.

Another aspect of the present disclosure is that the processing requirements of the images are within the capabilities of on-board processors (e.g., a CPU and GPU) even in environments where there are other visual distractions or noise picked up by the image capture device. The algorithms and processing methods described in this disclosure provide the benefit of keeping all necessary processing on-board the UAV, rather than having to be transmitted to another location. In order to evaluate the run-time performance of the GPU-code of the pose estimation algorithms, a series of specific experiments were carried out. These experiments comprised artificially increasing the number of the detected ellipses and evaluating the total computation time required by the GPU code as compared to the computation time required for detecting the marker alone. While the CPU-based functions such as findContours require a computation time that is proportional to the amount of information to process, the GPU-based functions show a computation time much less dependent to the amount of information to process. However the main drawback of the GPU computation concerns the time necessary to upload and download data between the CPU and GPU memory.

Figure 7A:
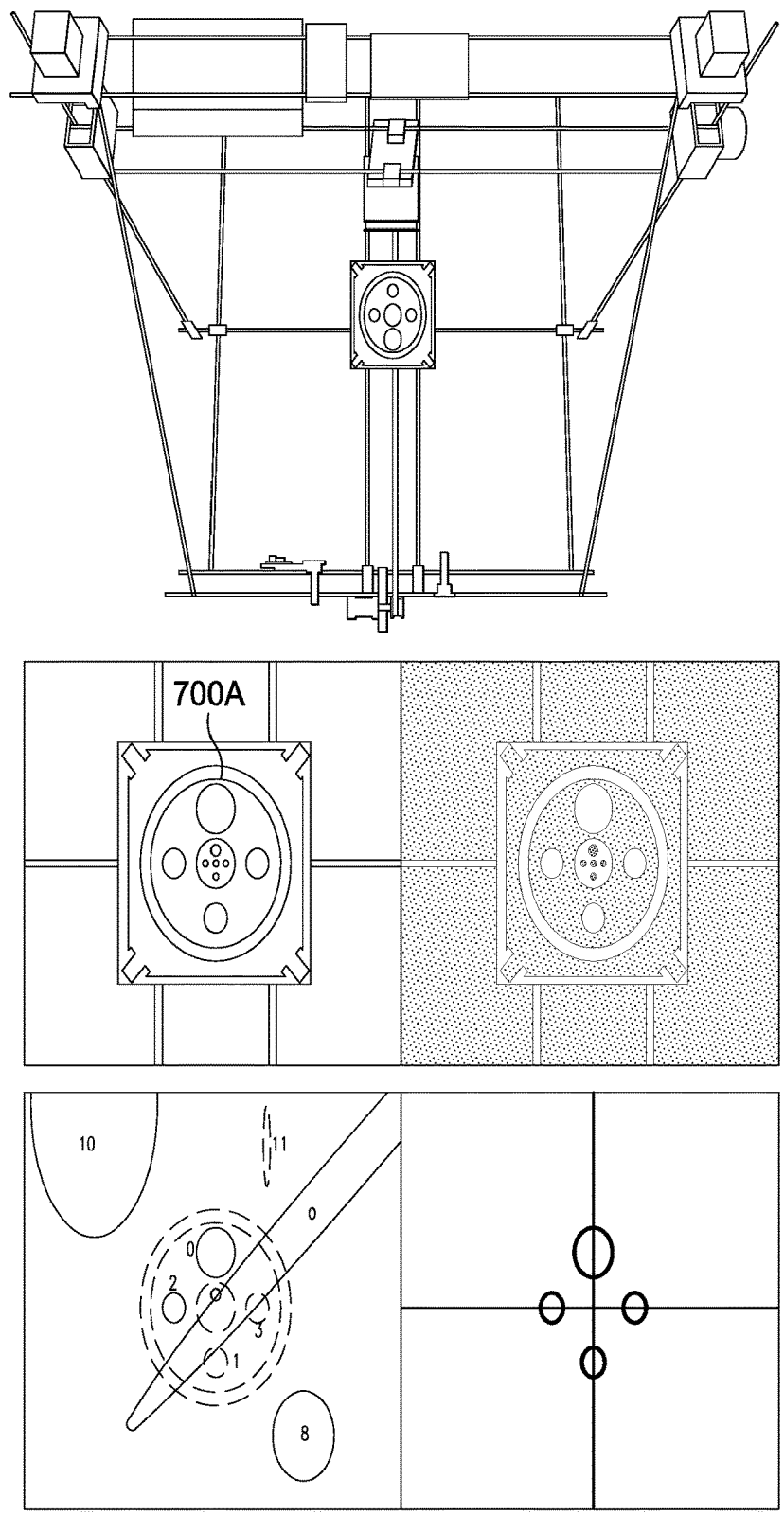
FIG. 7A shows an experimental setup where a visual marker is placed in a non-cluttered field along with camera views and processed visualizations of the marker.
Figure 7B:
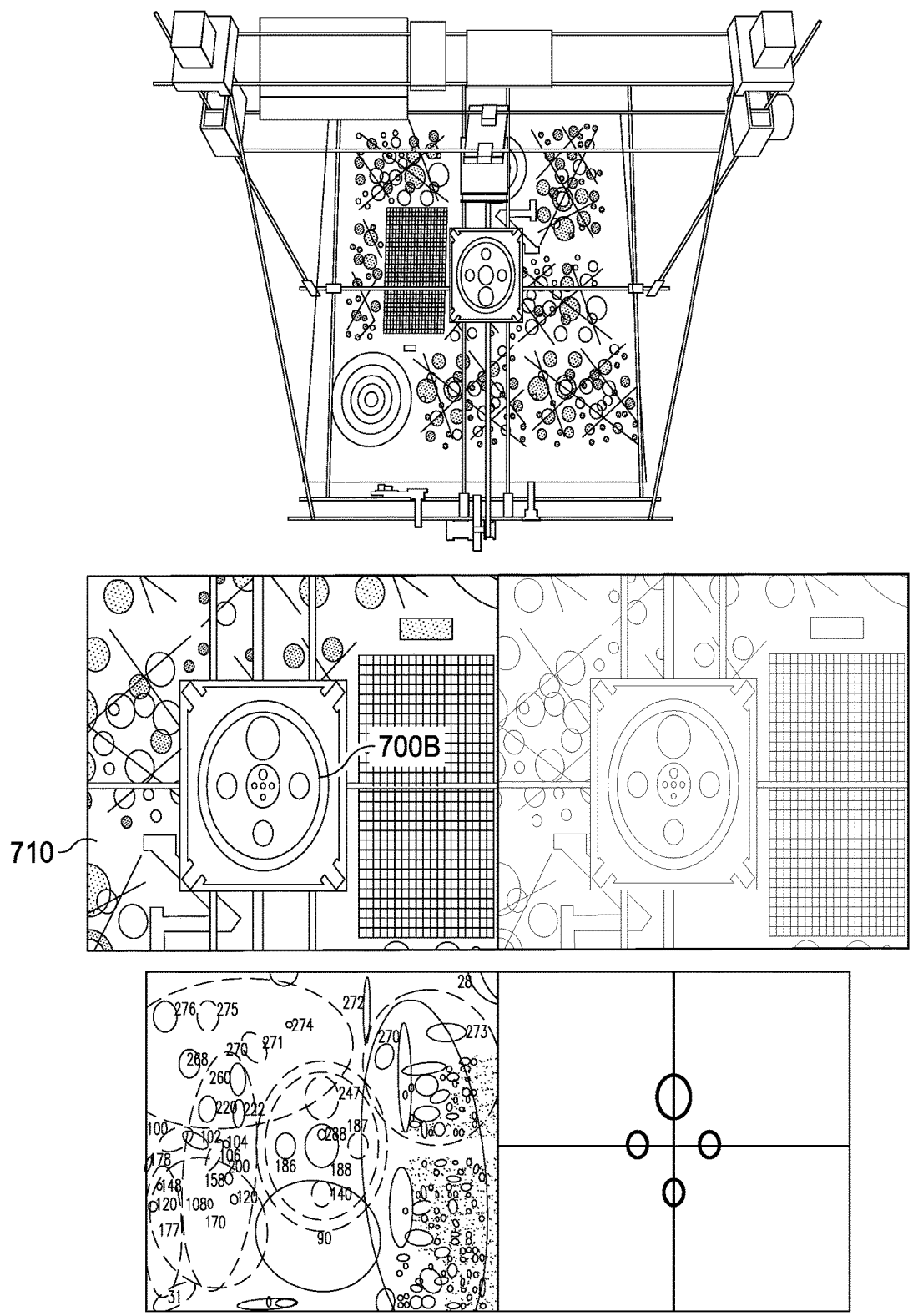
FIG. 7B shows another experimental setup where a visual marker is placed within a cluttered field along with camera views and processed visualizations of the marker.

In FIGS. 7A and 7B, two different tests artificially varying the number of ellipses detected by the algorithm are shown. FIG. 7A shows the marker 700A alone while FIG. 7B shows the marker 700B in the middle of a heavily cluttered field of other ellipses 710. This heavily cluttered field shown in FIG. 7B simulates difficult real-world landing conditions, such as when a marker is located among rocks or, it is raining. FIG. 8 shows the computation time required to elaborate the current frame comparing it with the number of ellipses found in that frame. The GPU implementation allows to have a limited computation time regardless the complexity of the image. FIG. 8 shows computation time compared to a number total ellipses found during the experiment using the heavily cluttered field shown in 7B. The lower, dark line describes the computation time in ms, while the upper, light line shows the corresponding number of found ellipses. The total computation time of the GPU-based Find Marker Routine is around three ms for every frame, regardless the number of detected ellipses, which in many instances, is up to 60 ellipses at once.

Figure 9:
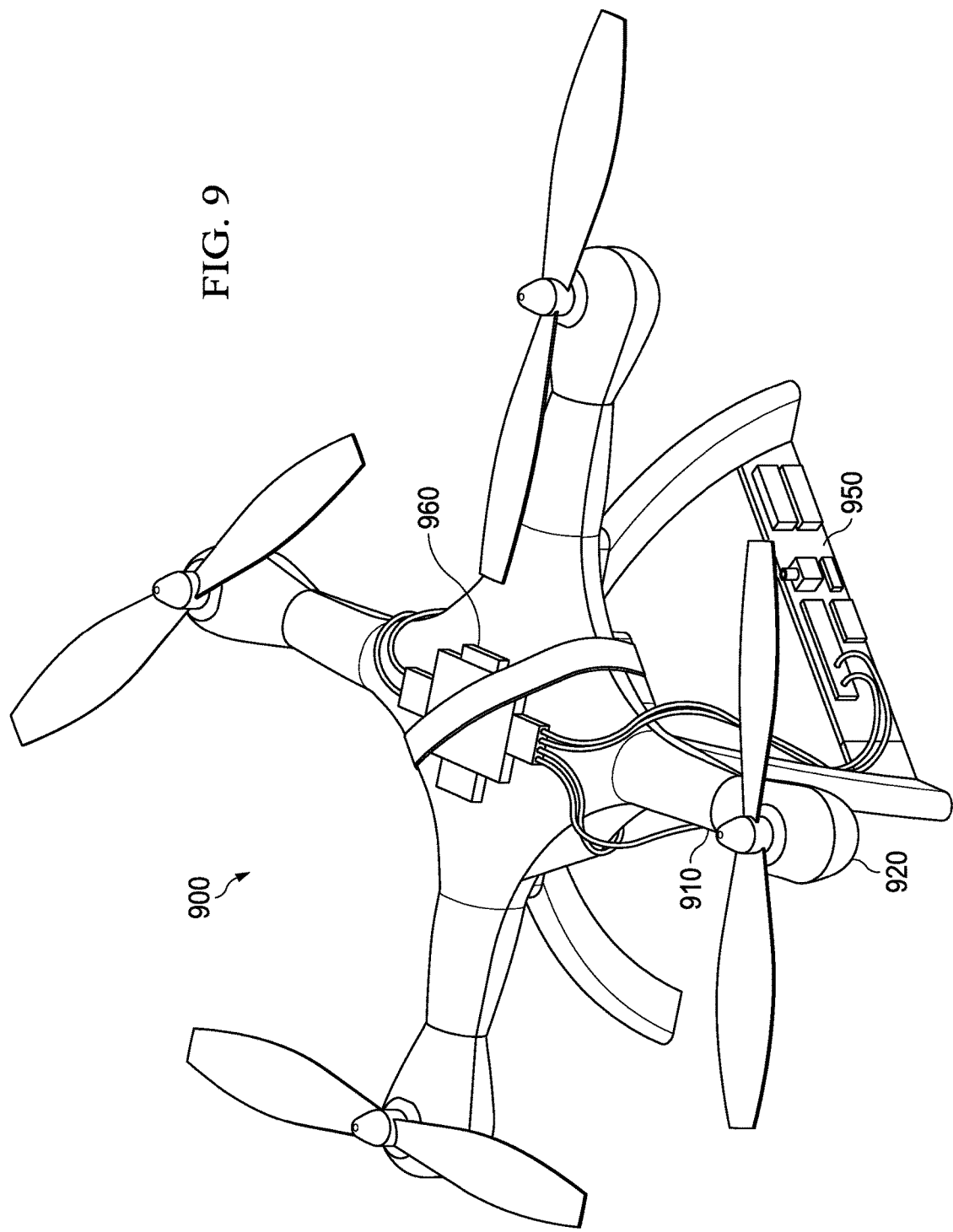
FIG. 9 shows a quadrotor UAV equipped with a pose estimation system of the present disclosure.

The pose estimation system of the present disclosure has also been evaluated in field tests. An exemplary UAV and pose estimation system setup is shown in FIG. 9. In this embodiment, which was used for testing the accuracy of the system, a DJI Phantom UAV 900 was equipped with an ultrasound sensor 910 and a Logitech C625 Camera 920 (mounted underneath the body of the 900), both for altitude estimation. Because of the limited payload of the DJI Phantom that prevented mounting a suitable GPU that may be used in non-test embodiments of the system (e.g., a Jetson TK1) on-board the UAV, a different system comprising a commercially available, light duty single-board computer 950 (a Raspberry Pi) is used to log data to be processed offline. Since the altitude estimation through sonar requires precise timing, the output of the sensor is processed by an XMOS XK-1A real-time microcontroller 960 (mounted on the top of the UAV). The altitude estimation is provided as input to the microcomputer 950 (Raspberry PI) along with the vision stream from the camera. The microcomputer 950 is responsible for synchronizing and logging data coming from the camera 920 and from the ultrasound sensor 910. Due the limited computing capability of the microcomputer 950, the video stream framerate was reduced to 7 Hz. However the time required to analyze each frame using the Jetson TK1 offline is less than 25 ms (CPU+GPU code). In non-test embodiments, therefore, a GPU is incoporated into the pose estimation system and mounted on-board the UAV.

Figure 10:
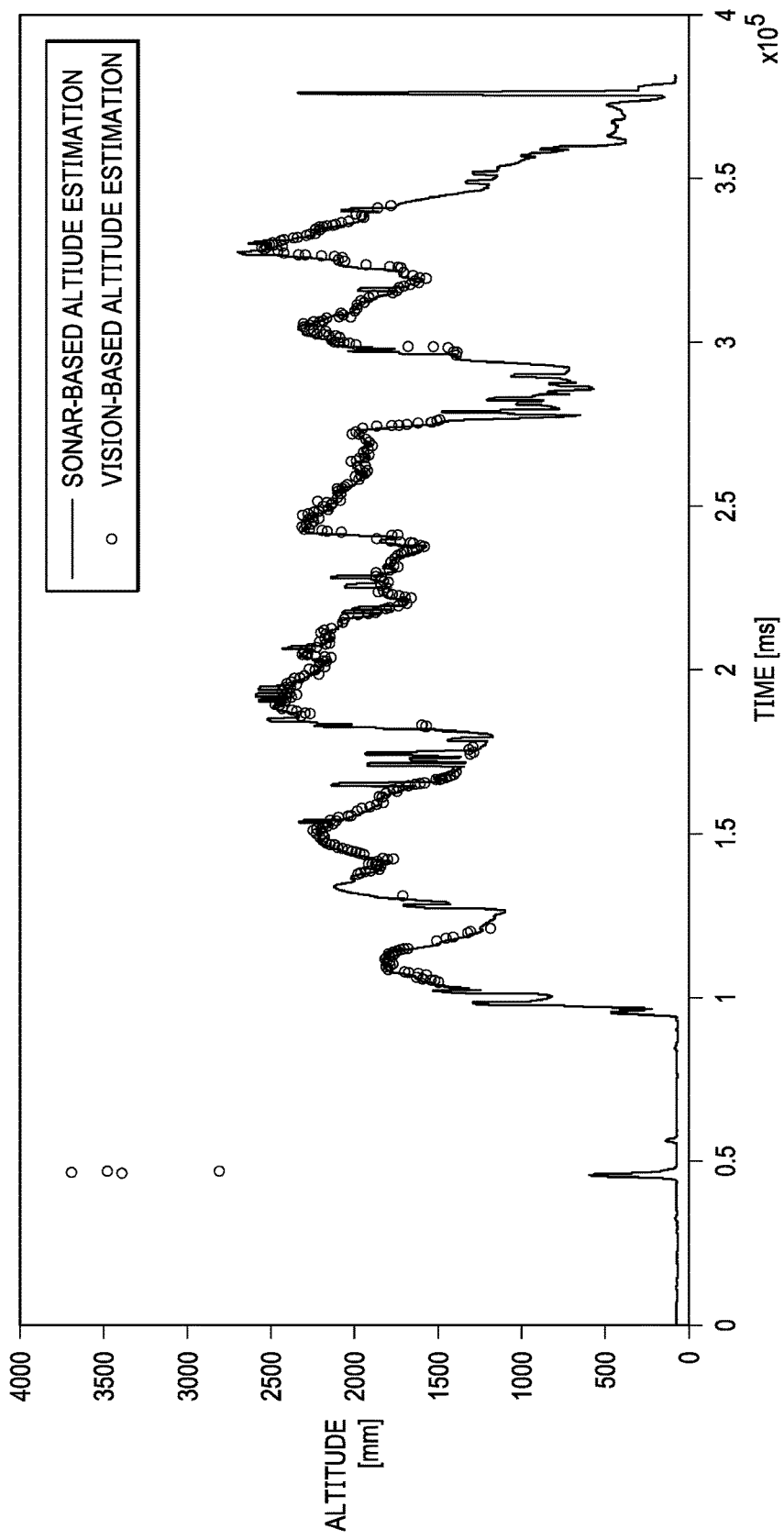
FIG. 10 is a graph showing a comparison between traditional sonar-based altitude estimation and vision-based altitude estimation through the pose estimation system of the present disclosure.

FIG. 10 shows the comparison between the altitude estimation using vision (when the marker is visible, depicted in dots) and the sonar (depicted as a line). In experiments, the UAV was flown around the marker with an altitude ranging between 0 and 2.5 meters. The error in the altitude estimation between the pose estimation system of the present disclosure and the detected sonar readings is less than 2 cm, at 2.5 meters above the landing surface. The diameter of the marker used for field testing is 270 mm. Therefore, the maximum error is less than 8% of the diameter of the marker, similar to the relative error seen in the laboratory tests.

The obtained results show that the algorithm of the present disclosure is able to provide accurate pose estimation with a minimum framerate of 30 fps and an image dimension of 640×480 pixels with error less than 8% of the marker diameter, allowing for autonomous takeoff and landing. The time required only by the GPU-computation is around three ms, regardless the complexity of the image. The overall architecture of the code can be adapted in order to a detect different marker, such as the "H" of a classical Helipad. Other embodiments may include improving the frame rate of the pose estimation, integrating inertial data to improve the pose estimation filtering, implementing a similar approach for a more generic marker such as the classical helipad or a LCD-based changeable markers and evaluating the power requirements for the Jetson TK1. Other embodiments may enable a GPU-based contour finding algorithm.

Figure 11:
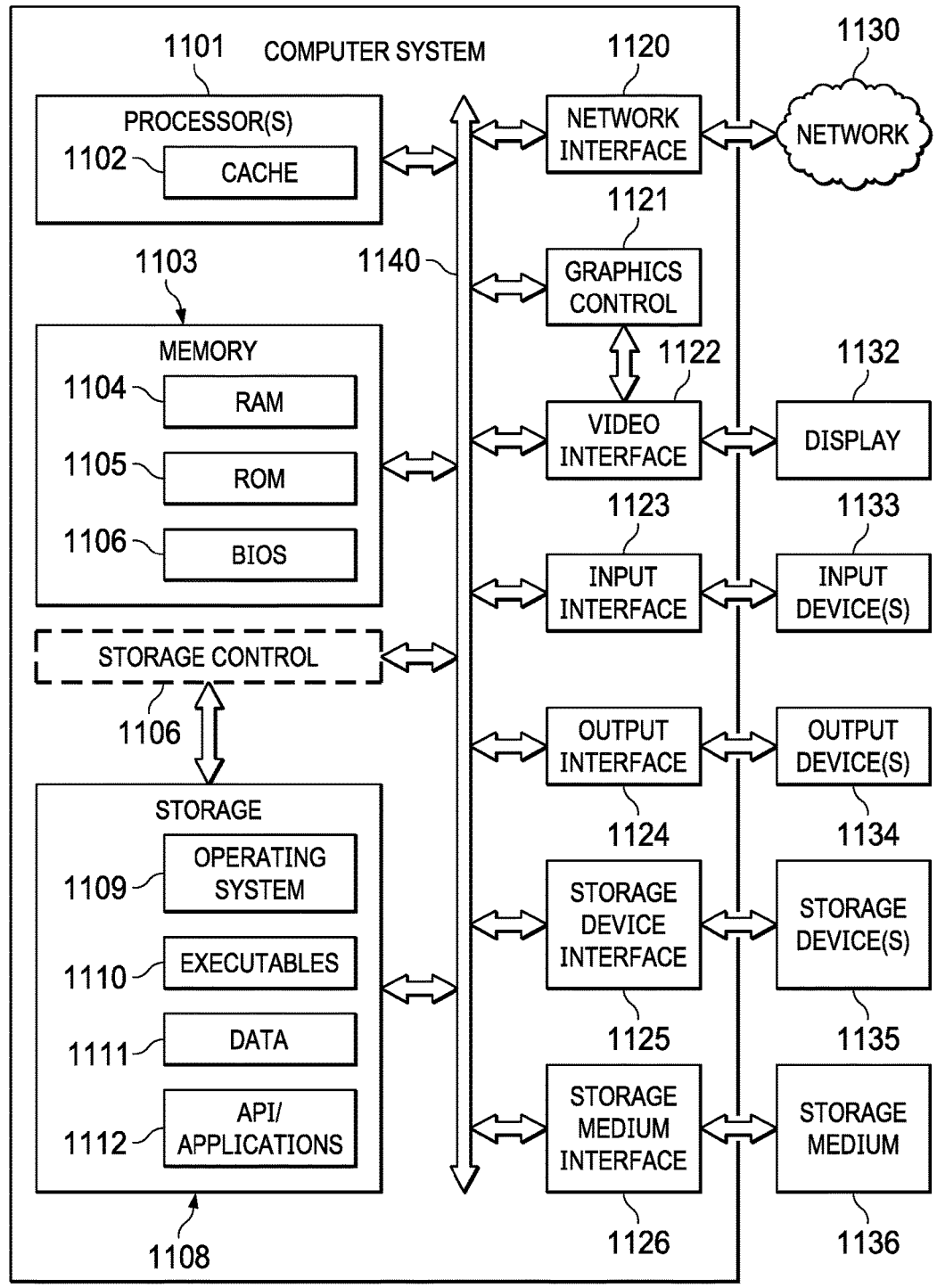
FIG. 11 is a logical block diagram of a computer system which may be used to implement aspects of the present disclosure.

Referring next to FIG. 11, it is a block diagram depicting an exemplary machine that includes a computer system 1100 within which a set of instructions can execute for causing a device to perform or execute any one or more of the aspects and/or methodologies for image processing on a GPU of the present disclosure. The components in FIG. 11 are examples only and do not limit the scope of use or functionality of any hardware, software, embedded logic component, or a combination of two or more such components implementing particular embodiments.

Computer system 1100 may include a processor 1101, a memory 1103, and a storage 1108 that communicate with each other, and with other components, via a bus 1140. The bus 1140 may also link a display 1132, one or more input devices 1133 (which may, for example, include a keypad, a keyboard, a mouse, a stylus, etc.), one or more output devices 1134, one or more storage devices 1135, and various tangible storage media 1136. All of these elements may interface directly or via one or more interfaces or adaptors to the bus 1140. For instance, the various tangible storage media 1136 can interface with the bus 1140 via storage medium interface 1126. Computer system 1100 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 1101 (or central processing unit(s) (CPU(s))) optionally contains a cache memory unit 1102 for temporary local storage of instructions, data, or computer addresses. Processor(s) 1101 are configured to assist in execution of computer readable instructions. Computer system 1100 may provide functionality for the components depicted in FIG. 1 as a result of the processor(s) 1101 executing non-transitory, processor-executable instructions embodied in one or more tangible computer-readable storage media, such as memory 1103, storage 1108, storage devices 1135, and/or storage medium 1136. The computer-readable media may store software that implements particular embodiments, and processor(s) 1101 may execute the software. Memory 1103 may read the software from one or more other computer-readable media (such as mass storage device(s) 1135, 1136) or from one or more other sources through a suitable interface, such as network interface 1120. The software may cause processor(s) 1101 to carry out one or more processes or one or more steps of one or more processes described or illustrated herein. Carrying out such processes or steps may include defining data structures stored in memory 1103 and modifying the data structures as directed by the software.

The memory 1103 may include various components (e.g., machine readable media) including, but not limited to, a random access memory component (e.g., RAM 1104) (e.g., a static RAM "SRAM", a dynamic RAM "DRAM, etc.), a read-only component (e.g., ROM 1105), and any combinations thereof. ROM 1105 may act to communicate data and instructions unidirectionally to processor(s) 1101, and RAM 1104 may act to communicate data and instructions bidirectionally with processor(s) 1101. ROM 1105 and RAM 1104 may include any suitable tangible computer-readable media described below. In one example, a basic input/output system 1106 (BIOS), including basic routines that help to transfer information between elements within computer system 1100, such as during start-up, may be stored in the memory 1103.

Fixed storage 1108 is connected bidirectionally to processor(s) 1101, optionally through storage control unit 1107. Fixed storage 1108 provides additional data storage capacity and may also include any suitable tangible computer-readable media described herein. Storage 1108 may be used to store operating system 1109, EXECs 1110 (executables), data 1111, API applications 1112 (application programs), and the like. Often, although not always, storage 1108 is a secondary storage medium (such as a hard disk) that is slower than primary storage (e.g., memory 1103). Storage 1108 can also include an optical disk drive, a solid-state memory device (e.g., flash-based systems), or a combination of any of the above. Information in storage 1108 may, in appropriate cases, be incorporated as virtual memory in memory 1103.

In one example, storage device(s) 1135 may be removably interfaced with computer system 1100 (e.g., via an external port connector (not shown)) via a storage device interface 1125. Particularly, storage device(s) 1135 and an associated machine-readable medium may provide nonvolatile and/or volatile storage of machine-readable instructions, data structures, program modules, and/or other data for the computer system 1100. In one example, software may reside, completely or partially, within a machine-readable medium on storage device(s) 1135. In another example, software may reside, completely or partially, within processor(s) 1101.

Bus 1140 connects a wide variety of subsystems. Herein, reference to a bus may encompass one or more digital signal lines serving a common function, where appropriate. Bus 1140 may be any of several types of bus structures including, but not limited to, a memory bus, a memory controller, a peripheral bus, a local bus, and any combinations thereof, using any of a variety of bus architectures. As an example, and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 1100 may also include an input device 1133. In one example, a user of computer system 1100 may enter commands and/or other information into computer system 1100 via input device(s) 1133. Examples of an input device(s) 1133 include, but are not limited to, an alpha-numeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 1133 may be interfaced to bus 1140 via any of a variety of input interfaces 1123 (e.g., input interface 1123) including, but not limited to, serial, parallel, game port, USB, FIREWIRE, THUNDERBOLT, or any combination of the above.

In particular embodiments, when computer system 1100 is connected to network 1130, computer system 1100 may communicate with other devices, specifically mobile devices and enterprise systems, connected to network 1130. Communications to and from computer system 1100 may be sent through network interface 1120. For example, network interface 1120 may receive incoming communications (such as requests or responses from other devices) in the form of one or more packets (such as Internet Protocol (IP) packets) from network 1130, and computer system 1100 may store the incoming communications in memory 1103 for processing. Computer system 1100 may similarly store outgoing communications (such as requests or responses to other devices) in the form of one or more packets in memory 1103 and communicated to network 1130 from network interface 1120. Processor(s) 1101 may access these communication packets stored in memory 1103 for processing.

Examples of the network interface 1120 include, but are not limited to, a network interface card, a modem, and any combination thereof. Examples of a network 1130 or network segment 1130 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combination thereof. A network, such as network 1130, may employ a wired and/or a wireless mode of communication. In general, any network topology may be used.

Information and data can be displayed through a display 1132. Examples of a display 1132 include, but are not limited to, a liquid crystal display (LCD), an organic liquid crystal display (OLED), a cathode ray tube (CRT), a plasma display, and any combinations thereof. The display 1132 can interface to the processor(s) 1101, memory 1103, and fixed storage 1108, as well as other devices, such as input device(s) 1133, via the bus 1140. The display 1132 is linked to the bus 1140 via a video interface 1122, and transport of data between the display 1132 and the bus 1140 can be controlled via the graphics control 1121.

In addition to a display 1132, computer system 1100 may include one or more other peripheral output devices 1134 including, but not limited to, an audio speaker, a printer, and any combination thereof. Such peripheral output devices may be connected to the bus 1140 via an output interface 1124. Examples of an output interface 1124 include, but are not limited to, a serial port, a parallel connection, a USB port, a FIREWIRE port, a THUNDERBOLT port, and any combination thereof.

In addition, or as an alternative, computer system 1100 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can

What is claimed is:

1. A method for estimating a pose of a first object in relation to a second object, the second object comprising a visual marker comprising a plurality of ellipses, the method comprising:
   capturing a video image of the visual marker with an image capture device on the first object;
   pre-processing frames of the video image on a graphics processing unit, detecting the visual marker at a first distance by:
      finding contours in the frames to identify the plurality of ellipses; and
      determining that a pattern of the plurality of ellipses match an existing, known pattern of the visual marker;
   obtaining coordinates of two or more of the plurality of ellipses of the visual marker;
   estimating the pose of the first object in relation to the second object by inputting the coordinates of the plurality of ellipses into a pose estimation algorithm;
   filtering results of the pose estimation algorithm;
      wherein the visual marker comprises a smaller replica visual marker of itself at a center portion of the visual marker, and wherein the method further comprises:
      detecting the smaller replica visual marker at a second distance, the second distance being shorter than the first distance; and
      estimating the pose of the first object in relation to the smaller replica visual marker.

2. The method of claim 1, wherein the first object is a unmanned aerial vehicle (UAV).

3. The method of claim 2, wherein the image capture device and the graphics processing unit are mounted on the UAV.

4. The method of claim 3, wherein the results of the pose estimation algorithm are used to control landing of the UAV.

5. The method of claim 1, wherein determining that a pattern of the plurality of ellipses match a known pattern of the visual marker takes place on the graphics processing unit.

6. The method of claim 1, wherein finding the contours in the frames to identify the plurality of ellipses takes place on a central processing unit associated with the graphics processing unit.

7. The method of claim 1, wherein the visual marker comprises one outer ellipse and at least four non-concentric inner ellipses inside the outer ellipse.

8. The method of claim 7, wherein the visual marker and the smaller replica visual marker each comprise at least four non-concentric inner ellipses inside an outer ellipse.

9. A system for estimating a pose of a first object in relation to a second object having a visual marker comprising a plurality of ellipses, the system comprising:
   a central processing unit;
   a graphics processing unit; and
   an image capture device, the system being configured to:
      capture a video image of the visual marker with an image capture device;
      pre-process frames of the video image on a graphics processing unit, detect the visual marker at a first distance by:
         finding contours in the frames to identify the plurality of ellipses; and
         determining that a pattern of the plurality of ellipses match an existing, known pattern of the visual marker;
      obtain coordinates of two or more of the plurality of ellipses of the visual marker;
      estimate the pose of the first object in relation to the second object by inputting the coordinates of the plurality of ellipses into a pose estimation algorithm;
      filtering results of the pose estimation algorithm;
         wherein the visual marker comprises a smaller replica visual marker of itself at a center portion of the visual marker, and wherein the method further comprises:
         detecting the smaller replica visual marker at a second distance, the second distance being shorter than the first distance; and
      estimating the pose of the first object in relation to the smaller replica visual marker.

10. The system of claim 9, wherein the first object is a unmanned aerial vehicle (UAV).

11. The system of claim 10, wherein the image capture device and the graphics processing unit are mounted on the UAV.

12. The system of claim 11, wherein the results of the pose estimation algorithm are used to control landing of the UAV.

13. The system of claim 9, wherein determining that a pattern of the plurality of ellipses match a known pattern of the visual marker takes place on the graphics processing unit.

14. The system of claim 9, wherein finding the contours in the frames to identify the plurality of ellipses takes place on the central processing unit.

15. The system of claim 9, wherein the visual marker comprises one outer ellipse and at least four non-concentric inner ellipses inside the outer ellipse.

16. The system of claim 15, wherein the visual marker and the smaller replica visual marker each comprise at least four non-concentric inner ellipses inside an outer ellipse.

17. A non-transitory, tangible computer readable storage medium, encoded with processor readable instructions to perform a method for estimating a pose of a first object in relation to a second object having a visual marker comprising a plurality of ellipses, the method comprising:
   capturing a video image of the visual marker with an image capture device;
   pre-processing frames of the video image on a graphics processing unit, detecting the visual marker at a first distance by:
      finding contours in the frames to identify the plurality of ellipses; and
      determining that a pattern of the plurality of ellipses match an existing, known pattern of the visual marker;

obtaining coordinates of two or more of the plurality of ellipses of the visual marker;

estimating the pose of the first object in relation to the second object by inputting the coordinates of the plurality of ellipses into a pose estimation algorithm;

filtering results of the pose estimation algorithm;

wherein the visual marker comprises a smaller replica visual marker of itself at a center portion of the visual marker, and wherein the method further comprises:

detecting the smaller replica visual marker at a second distance, the second distance being shorter than the first distance; and estimating the pose of the first object in relation to the smaller replica visual marker.

18. The non-transitory, tangible computer readable storage medium of claim 17, wherein the first movable object is a unmanned aerial vehicle (UAV).

19. The non-transitory, tangible computer readable storage medium of claim 18, wherein the image capture device and the graphics processing unit are mounted on the UAV.

20. The non-transitory, tangible computer readable storage medium of claim 19, wherein the results of the pose estimation algorithm are used to control landing of the UAV.

21. The non-transitory, tangible computer readable storage medium of claim 17, wherein determining that a pattern of the plurality of ellipses match a known pattern of the visual marker takes place on the graphics processing unit.

22. The non-transitory, tangible computer readable storage medium of claim 17, wherein finding the contours in the frames to identify the plurality of ellipses takes place on a central processing unit associated with the graphics processing unit.

* * * * *